US006067572A

United States Patent [19]

Jensen et al.

[11] Patent Number: 6,067,572

[45] Date of Patent: May 23, 2000

[54] EXTRINSICALLY INFLUENCED NEAR-OPTIMAL PATH APPARATUS AND METHOD

[75] Inventors: Delos Clark Jensen, Orem; Stephen R. Carter, Spanish Fork, both of Utah

[73] Assignee: Novell, Inc., Provo, Utah

[21] Appl. No.: 09/073,558

[22] Filed: May 6, 1998

Related U.S. Application Data

[63] Continuation-in-part of application No. 08/744,961, Nov. 7, 1996, Pat. No. 5,870,564.

[51] Int. Cl.[7] .......... G06F 16/30

[52] U.S. Cl. .......... 709/241; 395/500.47; 370/351; 370/238; 340/825.03

[58] Field of Search .......... 709/238, 239, 709/244, 243; 340/825.05, 826.01, 825.03, 827, 826; 320/351, 238, 248, 252, 254, 255, 257, 256; 712/11; 395/500.47

[56] References Cited

U.S. PATENT DOCUMENTS

| | | | |
|---|---|---|---|
| 4,967,345 | 10/1950 | Clarke et al. | 395/200.71 |
| 5,253,161 | 10/1993 | Nemirovskj et al. | 395/200.71 |
| 5,444,848 | 8/1995 | Johnson, Jr. et al. | 395/200.71 |
| 5,561,790 | 10/1996 | Fusaro | 395/500 |
| 5,583,996 | 12/1996 | Isuchiya | 395/200.71 |
| 5,596,719 | 1/1997 | Kamakrishnan et al. | 395/200.71 |
| 5,596,722 | 1/1997 | Rahnema | 395/200.71 |
| 5,604,868 | 2/1997 | Komine et al. | 395/200.68 |
| 5,634,011 | 5/1997 | Auerbach et al. | 395/200.71 |
| 5,682,479 | 10/1997 | Newhall et al. | 395/200.71 |
| 5,729,692 | 3/1998 | Qiu et al. | 395/200.71 |

OTHER PUBLICATIONS

Deasington; X.25 Explained: Protocol for Packet Swithcing Network; 2986, pp. 111–125.

Benos; Blocking States in Connecting Networks Made Square Switches Arranged in Stages; Apr. 1981, pp. 511–516.

*Primary Examiner*—Larry D. Donaghue
*Attorney, Agent, or Firm*—Madson Metcalf

[57] ABSTRACT

A method and apparatus for dynamically providing a path through a network of nodes or granules may use a limited, advanced look at potential steps along a plurality of available paths. Given an initial position, at an initial node or granule within a network, and some destination node or granule in the network, all nodes or granules may be represented in a connected graph. An apparatus and method may evaluate current potential paths, or edges between nodes still considered to lie in potential paths, according to some cost or distance function associated therewith. In evaluating potential paths or edges, the apparatus and method may consider extrinsic data which influences the cost or distance function for a path or edge. Each next edge may lie ahead across the advancing "partial" wavefront, toward a new candidate node being considered for the path. With each advancement of the wavefront, one or more potential paths, previously considered, may be dropped from consideration. Thus, a "partial" wavefront, limited in size (number of nodes and connecting edges) continues to evaluate some number of the best paths "so far." The method deletes worst paths, backs out of cul-de-sacs, and penalizes turning around. The method and apparatus may be implemented to manage a computer network, a computer internetwork, parallel processors, parallel processes in a multi-processing operating system, a smart scissor for a drawing application, and other systems of nodes.

20 Claims, 7 Drawing Sheets

EXTRINSICALLY INFLUENCED NEAR-OPTIMAL PATH APPARATUS AND METHOD

BACKGROUND

1. Related Applications

This application is a continuation-in-part of U.S. patent application Ser. No. 08/744,961 filed Nov. 7, 1996, now U.S. Pat. No. 5,870,549 and entitled "NEAR OPTIMAL PATH APPARATUS AND METHOD," which is incorporated herein by this reference.

2. The Field of the Invention

This invention relates to computer applications for controlling path dependent apparatus and processes such as networks and, more particularly, to novel systems and methods for providing a near optimal path, or a "pretty good" path through a process of such a network, even in the possible absence of a global knowledge of the system.

3. The Background Art

Many apparatus, machines, devices, and processes use a series of steps. Many times these may execute steps toward a destination or objective, while lacking global knowledge. That is, information is not available to assure that the next step executed is the "best" according to some criterion, or even that the next step will ever bring the process to the desired destination or result in an ultimate solution at all.

For example, directing messages or data packets is a serious traffic control question in many computer-controlled systems and environments. Some of these hardware systems may include individual processors using multiprocessing operating systems running parallel threads depending on various data queues. Also included are parallel processors, whether symmetric or non-symmetric, computer networks (networks or nets) such as a local area network (LAN), wide area network (WAN), or a network of networks (internetwork) depending on routers between networks.

Moreover, processes, processors, networks, and the components of each are not static. At a moment in time, a snapshot may be available to identify some portion of the current state of any process or apparatus. The snapshot may be thought of as an instantaneous view or description of the state or loading of a system at an instant of time. The loaded state may be characterized with reference to a ground, unloaded, base, or vacuum state. Typically a ground, base, or vacuum state of a system may be thought of as the configuration and capacity of the system with no loading. Thus, for example, a base or vacuum state may represent the capacities of components in a system having no activity or data messaging of the applications, processes, threads, data structures, lines, or components (or all of the above) in a system.

To obtain a true global view of all knowledge necessary to define the state of a system, the system would need to be static, or in instant communication. That is, messages take time to arrive, conditions change with time, and only a past state of the system can be completely defined. In an operating apparatus or process, a true global view is unavailable. Thus, a path through the apparatus (system) or process is not actually known, let alone an optimal path.

An instant after any snapshot in a dynamic system is recorded, the snapshot may be invalid. A process may have stopped, a data bit, word, or file may have changed or been deleted from a memory location, a router may go down, a processor may have crashed, an application may be hung or otherwise terminated, any hardware may have been taken off line, and the list goes on.

What is needed is an apparatus and method that can still route message traffic in a way that accommodates the changing and ambiguous nature of a dynamic system. Such a system needs to provide a better view than the static, vacuum, or ground state of the system. At the same time, a system needs to provide this view and provide a path without insisting that the path be perfect or the optimal path. A "pretty good path" or a "near optimal path" using the best "available" information in a dynamic system could be faster and more accurate than one using the ground or vacuum state information. At the same time, such a system could be faster than one that attempts to provide the optimal path. What is needed is an apparatus and method for eliminating part of the domain of choices in order to assure improved performance in the remaining portion of the domain.

Similarly, in individual applications, finding a best path through a process comprising parallel threads is often desirable. A user may need to allocate resources, or a processor may need to do so. Hard and fast rules as to operations may provide several unnecessary bottlenecks to a process during actual operation.

Optimization methods often require too much advance knowledge of a system, more than can be known. Moreover, optimal solutions to the efficient operation of a system may require extensive processing time to achieve. Again, in a dynamic system, the state of all the elements is not static anyway, so an optimal system may be impossible to find, especially in a useful time period.

In general, one may often enter a process not knowing all the upcoming options, let alone the ultimate outcome of each. Many decisions are over the horizon. The information to make them will be available later in the process. That is, certain decisions may be unknown to exist, may be made at intermediate destinations, and may rely on data available only at or shortly before presentation of the decision. Partial decisions can be made in anticipation of future information becoming available.

Like a rambling summer vacation through Europe, or the historic Atlantic seaboard of the United States, decisions may be based on where one is in a process, the cost and time required to advance to the next immediate step or location, whether or not a location, or even the path to it, is currently available at all, and the like. One may even find that an open path has become a cul-de-sac that must be backtracked to continue in a process or path.

What is needed is a generalized method to eliminate some choices, paths, etc., especially obvious choices, like options, destinations, paths, threads, or the like that are logjammed or out of service. Thus, simply improving the domain of possible choices may provide some substantial benefit, a near-optimal path.

In one particular example, such as a drawing package (application), finding a best path along a boundary of a visual feature evident to a user in a visual image is often critical. The human eye can detect features which a drawing or painting application needs to be able to recognize by some other method. For speed and utility, dependence on a user is often inefficient, impossible, time consuming, or inaccurate, requiring extensive editing or re-drawing. For example, to cut a portion of a feature out of an image in order to designate an object comprised of that single feature is a very valuable ability. Presently, no satisfactory tool exists in any drawing package to rapidly, even automatically, and accurately complete this process with a reasonable processing time on the processor accomplishing the function and in a reasonable wait time for a user. The need exists for automatic bounding of a feature recognizable by a human viewer, clipping the feature, and saving it as an individual object for multiple re-use. Defining a near-optimal path around the boundary of the feature in the image would need an automatic path-finding process that is not available. The current software art requires much user involvement or complex processing algorithms, and often both.

In summary, what is needed is a near-optimal path finding method and apparatus applicable to a dynamic system. The near-optimal path finder should decrease the requirements on user involvement. Path finding is needed that can acknowledge the probable lack of utility of certain paths or portions of paths, and systematically delete them from consideration in a search of possible paths through a dynamic system. Such narrowing of options, leaving a suitable working population of "better" choices of intermediate path segments is needed, to ultimately provide a "pretty good" path. Thus, the term "near-optimal," as used here, need not be as rigorously construed as the terms "optimal" or "near-optimal" would be in the mathematical theory of optimization.

BRIEF SUMMARY AND OBJECTS OF THE INVENTION

In view of the foregoing, it is a primary object of the present invention to provide an apparatus and method for providing a near-optimal path for a dynamic system.

It is a further object of the invention to provide an apparatus for determining a near-optimal path through a plurality of granules or nodes interconnected by edges.

It is an object to provide a near-optimal or improved path definition between a plurality of nodes interconnected by edges where each edge is associated with a unique connection between two nodes, and each node comprises a hardware component.

It is an object of the invention to agglomerate individual nodes into larger nodes or granules, where a single node is viewed as an atomic level granule, a group of single nodes is considered a molecule or molecular level granule, and collections or agglomerations of molecular granules are super-molecules or granules.

It is another object of the invention to provide a system of granules interconnected with a topology where each granule comprises one or more nodes operably connected by edges, and wherein each edge has associated with it an unloaded state reflecting a capacity or measure of the edge.

It is an object of the invention to provide a system management apparatus and method for finding an improved path between granules interconnected in a topology and each comprising one or more nodes operably interconnected by an edge between each pair of interconnected nodes, wherein each edge has a state associated therewith and represented by data corresponding to a capacity, distance, or other measure or metric associated with the edge.

It is another object to provide a method and apparatus for storing state data associated with the states of a plurality of edges interconnecting a plurality of granules in a network, wherein the network may be represented as a connected graph, such that the state data is stored in a memory device to be retrievable and periodically updatable.

It is another object of the invention to provide a vacuum space within a memory device for storing vacuum data corresponding to a topology of interconnected granules in a network, or partial network, represented by a connected graph, the topology corresponding to an unloaded state.

It is an object of the invention to provide a load space in a memory device, the load space containing data corresponding to a topology of granules interconnected by edges in a network, or partial network, represented by a connected graph, and data corresponding to capacities of the granules and edges in a loaded state.

It is an object of the invention to provide a management system for pathfinding in a network of interconnected granules, wherein the individual granules may provide management of pathfinding within themselves for paths between sub-granules or nodes included within the granules.

It is another object of the invention to provide a management system for pathfinding in a network of interconnected granules, comprising lower level granules within larger, higher level granules, within largest, highest level granules, with each granule providing system management of path finding within itself.

It is an object to provide an apparatus running one or more threads to provide granule event management, by updating a load space with data representing changes in a metric, such as a distance, cost, capacity, bandwidth, or the like associated with an edge interconnecting adjacent granules, and granule management effective to provide data associated with a grouping of individual nodes agglomerated into granules, the granules being interconnected into a network represented by a connected graph.

It is an object to provide an apparatus and method for determining an improved path, which may be characterized as a pretty good path or near-optimal path between two granules interconnected in a network representable by a connected graph, using an advancing wavefront to evaluate prospective paths, and using the evaluation of prospective paths to eliminate from consideration evaluated paths, and thus limit the extent of the advancing wavefront.

It is an object of the invention to provide a method and apparatus for managing a network, and message traffic over a network, of interconnected granules, by using an advancing wavefront to evaluate a path segment by assessing the benefit of a net path including the path segment and a potential future path segment depending on the path segment, where a path segment is an edge between adjacent granules in a network, and wherein all costs, distances, measures, metrics, capacities, and the like, along a path between the adjacent granules are associated with the edge therebetween.

It is another object of the invention to provide an apparatus and method for assisting a user of a drawing or painting application running on a computer, to rapidly and automatically determine an edge of a visual feature, interpretable by an eye of a user.

It is another object of the invention to provide an apparatus and method for assisting a user of a drawing or painting application running on a computer, to rapidly and automatically determine a physical or visual boundary or edge of a visual feature, such as may be interpretable by an eye of a user, wherein the visual feature is integral to a continuous bitmap, and is not an independent or individual object recognized by the drawing application.

It is another object of the invention to provide a "smart scissors" tool adaptable to be used with a drawing application package and effective to rapidly and automatically designate a visual feature detectable by an eye of a user, with a minimal involvement by a user in designating the boundary or visual edge of the visual feature.

It is yet another object of the invention to provide a method and apparatus for determining an improved path, such as a pretty good path or a near-optimal path, between two nodes or granules within a network of finite size, wherein each node or granule may include one or more elements recognized by the network at the smallest increment or level of network recognition, in a dynamic environment, with the network operating, using a processor comparable with the processor of the individual nodes within the network.

Consistent with the foregoing objects, and in accordance with the invention as embodied and broadly described herein, a method and apparatus are disclosed in certain embodiments of the present invention as including a processor of a computer running one or more threads or processes for managing a network. The processor may be connected to a memory device hosting data structures for storing data corresponding to the network geometry and topology, the connection scheme of edges between nodes or granules within the network, unloaded data corresponding to the network, and load data corresponding to the loaded network.

The threads or processes operating on the processor manage feedback from the nodes or granules within the network. The expression "feedback," as used here, need not be strictly construed according to control theory. Rather, a response may be provided to reflect a condition of a member of a network. Any suitable communication method, such as broadcasting, polling, requesting or the like may apply. Similarly, any data structure, such as a queue, stack, list, database, or the like may provide data generated, reported, or received. Data may be generated and reported independently and asynchronously.

Such data or "feedback" may be relied upon to modify or update the load space storing the load data related to the load states of individual nodes or granules within the network. The threads or processes also may manage a vacuum space storing data corresponding to the unloaded states, such as total basic capacity, associated with the edges (connections) and granules of the network, as well as a granule space storing data corresponding to the geometry and topology of the network.

In one embodiment of the apparatus and method made in accordance with the present invention, extrinsic data is additionally relied upon to modify or update the load space storing the load data. The extrinsic data may also be relied upon to manage the vacuum space. Extrinsic data is derived outside the management system of the apparatus. The extrinsic data is used to generate weighting factors for potential paths or edges and may be integrated with feedback data to influence load decisions.

In another embodiment of the apparatus and method made in accordance with the present invention, a drawing tool may be provided for extracting a visual feature from a bitmap representing one or more visual features interpretable by a user, and indistinguishable by a conventional drawing package or drawing tool. That is, where a bitmap or an object represented by a bitmap comprises visual elements or visual features interpretable by a user, but not recognizable individually by the drawing application controlling the bitmap, an apparatus and method in accordance with the invention provide a "smart scissors" tool. The tool is effective for determining, for the application, the visual boundary or visual edge of a visual feature. The tool may define the included portion of the bitmap, and create a separate object comprised of only the portion representing the visual feature. Thus, an apparatus and method in accordance with the invention provide a tool for extracting a visual feature from a bitmap and creating an object containing only the visual feature, or a data representation of the visual feature.

A system may contain individual units capable of interacting. For example, a LAN may contain several interconnected elements such as work stations, clients, computers, processors, or the like. Communication links, communication lines, backbones, and the like may be included also.

Each element may be regarded as a node or else as part of an edge. An edge may be thought of as a connection or a path segment between two nodes. Each node may be analogized to an atom, the smallest participant in the system. Each unit may also be thought of as either a granule or an edge. Thus an individual node on a network, the node containing a single client, may be the smallest granule.

At a higher level, the entire LAN may be viewed as a large granule of nodes agglomerated for convenience. This large granule may contain an instantiation of a management system (pathfinder) operating only within the granule, so that the granule need not be treated by a higher level management system managing a group of such large granules. The analogy can be invoked to represent the LAN as a molecule, or even as part of a WAN represented as a super molecule.

The granularity of an internetwork may be more useful if a router connecting two LANs deals with each molecule or LAN as a single granule, not dealing with the individual workstations. Thus the individual nodes need not be included as individual granules, but may be, and may be mixed with molecules and super molecules in a single managed system or managed network.

For convenience, the nodes may be combined in large, managed networks, with each network of lesser extent therein treated as a unit or granule. A basic network such as a LAN may be thought of as a molecule of atoms. Thus, for convenience, one molecule or network may be treated as a unit or granule. A supermolecule might exist, containing several molecules (or other supermolecules) or networks as a granule. Any number (typically finite) of granules may be interconnected to form a managed system, an internetwork of arbitrary composition.

Granules may be of different sizes, but each may be treated as a granule capable of connecting to other granules in the system. Overall, from a system point of view, it is of interest only that the internals of a granule be operable and definable to the granule. The system of granules, some state for each granule is important, not how the granule achieves that state internally.

Communication links may conceivably be represented as nodes (atomic level granules), although they will more often be treated as edges (i.e. connectors, connections between nodes). In fact, as explained in Example I below, the states of mathematical nodes (granules here, of whatever level of agglomeration) may be conveniently attributed to their interconnecting edges.

A topology of a system may include, for example, a geometry, connections, and a metric. Mathematically, a definition of open sets defines a topology. Because granules are operably interconnected, they may define a metric inherent in the topology, which can be derived. This may be a distance or cost between nodes or granules. For example, associated with any connection between granules may be a bandwidth at which communication may occur between the granules joined by that connection.

Given a topology of connected nodes, most practical systems will have a metric (some measurable quantity) that can be derived from the topology. For example, given two networks, they can be connected by a router and appropriate lines. The router and lines, together with the functional characteristics of the individual networks may define a maximum bandwidth for communication between the networks over the connection scheme (mathematically an edge between two nodes). The bandwidth may be one property that could be associated with speed, message traffic volume, cost, or other capacity.

Connections between mathematical nodes (granules of whatever composition) in a connected graph may be characterized as mathematical edges. This is easily remembered by a mental model of a simple graph where adjacent pixels in a cartesian grid share a mutual edge. In a sense, one can define a property called distance to be the best value of any performance parameter between two nodes or granules. The mathematical edge, as a connection between mathematical nodes, is more easily visualized as the connecting links and backbone between clients (e.g. workstations) in a computer network example.

Mathematically, it is useful if such a distance parameter has the properties of symmetry, definiteness, and the triangle inequality. For example, a greatest lower bound of shortest paths along an edge or connection is a distance. With a metric such as distance, and a connectivity between nodes or granules, one can then define a metric space. Thus a topology of our system may be defined. Thus, a network of nodes may be modeled as discussed in Example I below as a connected graph containing nodes and edges.

A granule or node may have a state, representing a distance, cost, or the like associated with it. Likewise a connection or edge may have a state, distance, cost, or the like associated with it. Typically, such a state represents an ease, difficulty, loss, penalty, etc. of using, accessing, or traversing the respective element with which the state is associated. As a practical device, relying on set theory and the ability to uniquely associate elements with their connections via a relation, one may assign to a connection or edge the entire state information (burden) associated with the connection itself and the elements (granules, nodes) connected by the connection or edge.

Thus, in an apparatus and method in accordance with the invention, the state data may comprise data reflecting the physical state or burden associated with a node, or a connection. Meanwhile, the state may be identified just with the edge or connection, while actually including some or all of the associated data corresponding to the physical states of the nodes on either end of the connection or edge.

A base, vacuum, or unloaded state may be used to represent a mathematical object referred to as a connected graph. A graph may be comprised of a set of devices or collections of devices called granules (mathematical nodes). For example, a LAN may have several individual workstations identified as network nodes. Each node may be considered to be a granule or agglomerated as part of a larger granule.

A method and apparatus for providing a near-optimal path through a network of nodes or granules may use a limited advanced look at potential steps that may be taken along a plurality of available paths. The method may be implemented on a general purpose computer, in a set of parallel processes or threads, or may be distributed across several processors. An apparatus for determining a near-optimal path limits the potential paths by implementing an expanding wavefront. That is, given an initial position at a node or granule within a network and some destination node or granule in the network, all nodes or granules may be represented as "nodes" in a connected graph.

Connections between adjacent nodes in the connected graph may be represented as mathematical edges. A management system (e.g. as part of an operating system, for example) operating according to the method of the invention evaluates currently acceptable potential path segments or edges. These edges are between individual granules (mathematical nodes) still considered to lie in potential paths. Evaluation is according to edges' preferability. Preferability may be determined from a cost or distance function associated with each next edge advancing across a wavefront to a new node being considered. A new node is one considered as a possible intermediate destination on a next possible path segment, on the path sought to the destination node. According to the benefit, distance, and cost that would be incurred by the current path being considered to a node in question, and the additional cost, distance, and benefit of a next or all next steps from the node in question, the node in question is evaluated against all other nodes in question.

Nodes are eliminated according to a certain distribution or chance, and based upon their relative costs, distances, and benefits. With each advancement of the wavefront to another set of connecting next nodes, one or more potential paths, previously considered, may be dropped from consideration. Thus, the advancing wavefront is actually a partial wave front, limited in size (number of nodes and connecting edges considered) but maintaining some number of the best paths evaluated to that point.

Where a system is typically dynamic, all data is not available for determining an optimal path. Moreover, optimal paths may change. Therefore, a good path will be found, while worst paths will be deleted from consideration. The method and apparatus may be implemented to manage a computer network, a computer internetwork, parallel processors, parallel processes in a single processor operating under a multi-processing operating system, a smart scissor for a drawing application, and other systems that may be characterized by multiple nodes or granules connected by connectors or edges having some definable relation.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
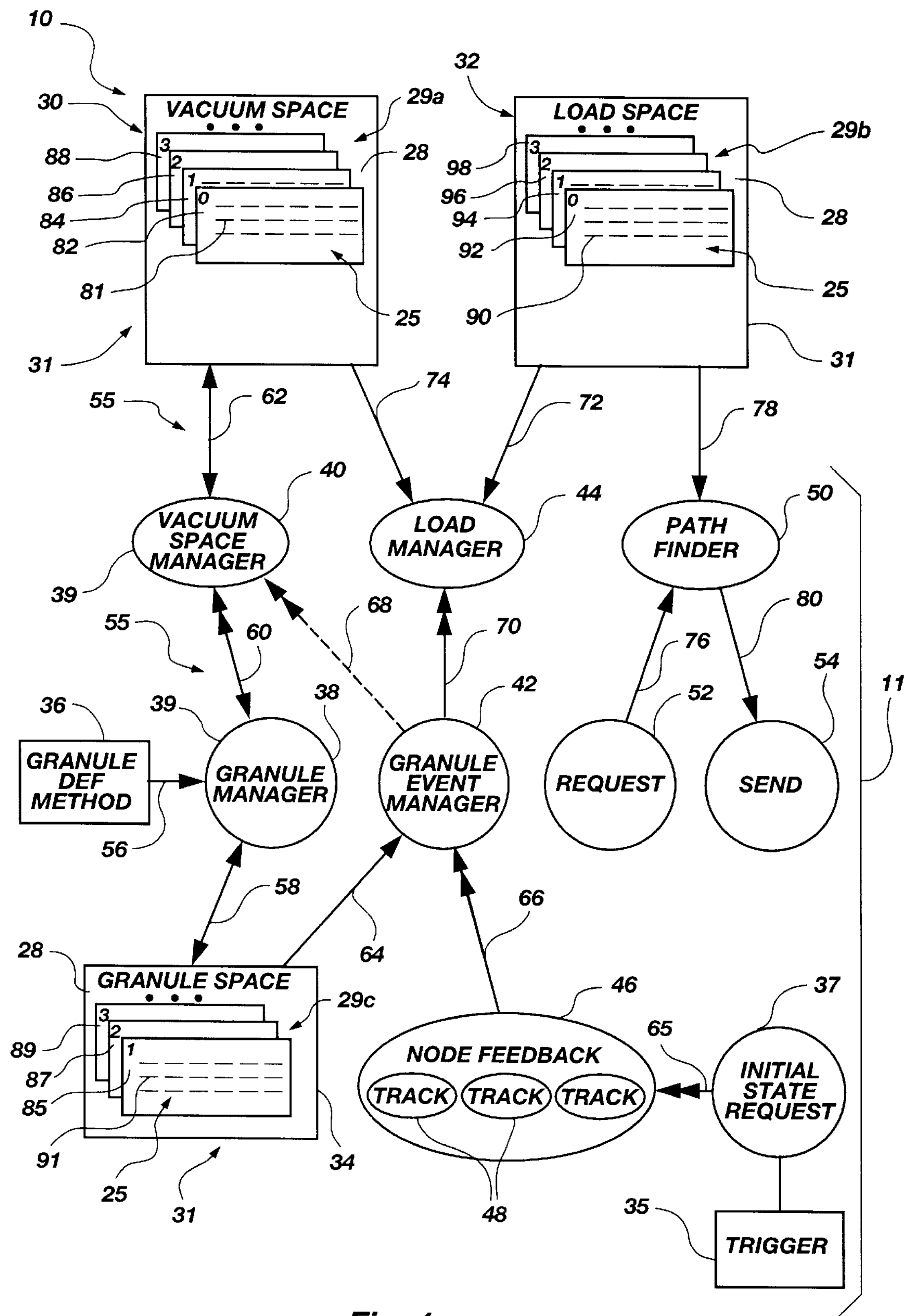
FIG. 1 is a schematic block diagram of one embodiment of an architecture of a system configured in accordance with the invention.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 5, is not intended to limit the scope of the invention, as claimed, but it is merely representative of certain presently preferred embodiments of the invention.

The presently preferred embodiments of the invention will be best understood by reference to the drawings, wherein like parts are designated by like numerals throughout. The reader is referred to FIGS. 1–5. In one embodiment, a management system 10 may include a process 11 comprising one or more threads 39 running on one or more clients 100 or nodes 100 in a managed system 12 or network 12. The management system 10 may be external to the managed system 12, representable as a connected graph 12.

Referring to FIGS. 1–5, the threads 37, 38, 40, 42, 44, 46, 48, 50, 52, 54 (in general, a thread 39) may communicate with one another as necessary or beneficial by way of messages 56, 58, 60, 62, 64, 65, 66, 68, 70, 72, 74, 76, 78, 80 (in general, a message 55). The threads 37, 38, 40, 42, 44, 46, 48, 50, 52, 54 may also communicate with the spaces 30, 32, 34 or memory blocks 30, 32, 34 (in general, a data structure 31) in the memory device 120. The threads 37, 38, 40, 42, 44, 46, 48, 50, 52, 54 may operate on the CPU 110 in an individual node 100 or management system 100, or may be distributed among several nodes 14, such as the nodes 130, 134, 136 of FIG. 2. An apparatus and method in accordance with the invention may treat individual granules 16, 18 as if they were nodes 14. Nevertheless, a node 14, in a network sense, may be considered to be an atomic level or most basic individual level at which a node may be defined in a network 102, 106 or connected graph 26, 28 (see FIGS. 3, 4). The spaces 30, 32, 34 or memory blocks 30, 32, 34 may contain data 28 configured in data sets *29a, 29b, 29c,* or just generally referred to as data sets 29. That is, when a reference numeral is here used with a trailing reference letter, the numeral alone signifies all elements of the group designated by the reference numeral with trailing letters. Thus, a data set 29 may be created for any space 30, 32, 34 or memory block 30, 32, 34 in a memory device such as the RAM 120.

In general, a message 55 may pass between threads 39 or between a thread 39 (e.g. thread 40) and a data structure 31 (e.g. vacuum space 30), which may be thought of, and referred to, as a data block 31, data space 31, or simply space 31 in a memory device 120. Thus, in general, a thread 39 may communicate by means of a message 55 having a specific character (containing data 28) to be shared with another thread 39 or a data structure 31. In general, a message 55 may be a read, a write, or the like by a suitable method, including queues, lists, stacks, or databases, as data structures 31 for storing the data 28 corresponding to the information in the message 55.

Reference is first made to FIGS. 1–5, which illustrate schematic block diagrams of certain preferred embodiments of an apparatus and method made in accordance with the invention. Those of ordinary skill in the art will, of course, appreciate that various modifications to the detailed schematic diagrams of FIGS. 1–5 may easily be made without departing from the essential characteristics of the invention, as described in connection with the invention. Thus, the following description is intended only to illustrate certain examples, and simply illustrates certain presently preferred embodiments thereof.

Referring to FIG. 1, several threads 38, 40, 42, 44, 46,48, 50, 52, 54 (in general, threads 39) may operate simultaneously, in parallel, consolidated into a single processor, or distributed among several processors. The definition process 36 and trigger process 35 may be executed by a human, or may be provided as a thread or process of another device. In one embodiment, the processes 35, 36 may be performed by a user, since cognitive processes are required to recognize a triggering event for initiating a state requirement in the thread 37 or for defining a methodology or granule definition in the granule definition process 36.

Thus, FIG. 1 illustrates an embodiment of an architecture that may be used to implement an apparatus and method in accordance with the invention. Alternative architectures are contemplated for implementing the invention, in order to accomplish the functions and results of the illustrated embodiment.

In FIG. 1, the data structures 31 may be thought of as holding a collection of record sets 29. The record sets *29a* may be thought of as the record sets 82, 84, 86, 88, while the record sets *29b* may be thought of as the data sets 92, 94, 96, 98. Likewise, the record sets *29c* may the thought of as the record sets 85, 87, 89. Thus, each record set 29 may be a collection of other record sets (e.g. 82, 84, 92, 94, 85, 87). Each of the record sets 29 may contain numerous individual records 25. For example, the record set 82 in the vacuum space 30 contains records 81. Similarly, the record set 92 in the load space 32 contains the records 90. The granule space 34 is configured with record set 85 containing individual records 91. However, the zeroth level, of the granule space may be saved in the record set 82 of the vacuum space.

Higher numbered levels or layers of record sets 29 correspond to greater levels of agglomeration with respect to granules 22. The zeroth level of the record sets 81, 90 may be stored in the vacuum space 30 with the vacuum state data, and the load space 32, respectively. Duplication may be avoided, along with the addressing and updating problems that it introduces, by leaving no zeroth level record in the granules space. One may think of the zeroth level as that level at which no agglomeration exists.

In the illustrated embodiment of FIG. 1, a granule manager 38 may be a thread for taking definitions 56, defining granules, and processing freed information 58 from the granule space 34 to provide no-load capacity data in a message 60 to a vacuum space manager 40. The vacuum space manager 40 may both read and write to the granule manager 38. The double arrows indicate that the messages 60 to the vacuum space manager 40 may be directed from many sources to a single destination or in a one-to-many relation.

The granule manager 38 has the functional responsibility to use a methodology 56 provided in the message 56 from a granule definition method process 36 to provide data to the vacuum space manager 40 in the message 60. The vacuum space manager uses data received to accomplish its functional responsibility to create or modify the data 28 in the vacuum space 30.

The vacuum space manager 40 may accept data representing granulization or granule definition in the message 60 from the granule manager 38, as well as initialization data 68 from a granule event manager 42. The vacuum space manager 40 incorporates the data 60, 80 to provide vacuum space data 62. The vacuum space manager 40 may both create the data within the vacuum space as well as update the records 81 and record sets 82, 84, 86, 88 in the vacuum space 30. Thus, the message 62 may be a read by the vacuum space manager 40 of the vacuum space 30, or may be a write by the vacuum space manager 40 to the vacuum space 30. That is, an update may require a read 62 prior to a write 62 between the vacuum space manager 40 and the vacuum space 40.

The vacuum space 30 has the functional responsibility to store the record sets 29 associated with the network 12 in the ground, vacuum, or unloaded state. The load space 32 has a functional responsibility to store the record sets 29*b* associated with the network 12 in its loaded state as best known. Thus, the record sets 29*a* of the vacuum space 30 may reflect the capacity and geometry, including the connection scheme of a group of nodes 14 within a network 13 or connected graph 13.

The load space 32 has the functional responsibility to store the record set 29*b* associated with a network 12 or managed system 12, which may be characterized as a connected graph 13 or network 13, reflecting the geometry as well as the loaded state of all nodes 14 or granules 22. Similarly, the granule space 34 has the functional responsibility to store the record sets 29*c* reflecting the granularization of the connected graph 13 or managed system 12. For example, the record sets 29*c* of the granule space reflect the connection scheme between nodes 14 and granules 22, as well as the agglomeration of nodes 14 into molecules 16 or super-molecules 18, and the like. By contrast, the vacuum space 30 or the record sets 29*a* stored in the vacuum space 30 correspond to, or reflect the data 28, from the granule space 34 as processed by the vacuum space manager 42 and represent the capacities of all edges 20 between granules 22 in the connected graph 13 or network 13. It is well to remember that an edge, in a mathematical sense, may be thought of as a connection. A connection may actually be a relation. For example, in Example II below a simple cartesian geometry of pixels share edges. (See also FIG. 4.)

Likewise, the load space 32 has a functional responsibility for storing the data sets 29*b* reflecting the loaded state of the managed system 12. Referring to Example I, the data sets 29*b* may include geometry data as well as loading data reflecting the actual capacities of edges 20 as of some most recent report of node load data 66 from the node feedback thread 46 to the granule event manager 42 as adapted by the load manager 44 into the records 90 of the appropriate record set 92, 94, 96, or 98.

One may note that the expressions "network" 12 and "managed system" 12 may be used interchangeably. Likewise, the expression "connected graph" 13 can be used interchangeably with the expression "network" 13. As a practical matter, a network 12 may be a hardware system. A connected graph 13 may be a modeling representation 13 of such a network 12. Nevertheless, so far as implementation of a method and apparatus in accordance with the invention, a network 12 or managed system 12 may be represented as a connected graph 13, and thus be managed by the apparatus 10.

The granule definition method 36 is responsible for defining the methodology by which granule sizes or agglomerations of granules 22 (see FIG. 3) or nodes 14 to make granules 22 is accomplished. The granule manager 38 creates, or defines, the granules 22. The vacuum space manager 40 has functional responsibility for creating and updating the data structures 29*a* in the vacuum space 30. The granule event manager has the functional responsibility for providing to the load manager 44 the load data based upon feedback of data 66 received from a node feedback thread 46. The granule event manager may obtain data 28 from the data structure 29*c* of the granule space 34. The load manager 44 has functional responsibility to create and update the data structure 29*b* in the load space 32. The load manager may read or otherwise receive data 28 from the vacuum space 30, the data structures 29*a*, as well as load data from the granule event manager 42. The load manager 44 may have both read and write capability with respect to the load space 32, since updating benefits from being able to read a data structure 29*b* before changing it.

In general, the granule definition method 36 involves cognitive process by an individual or a process by which the methodology for determining a granularization of a system is determined. Thus, the granule definition method 36 is a generalized process for determining granule definition according to some criteria. In general, the granule definition method 36 may begin at an atomic level, that is the level at which every node 14 is treated as an individual entity within a network.

Figure 3:
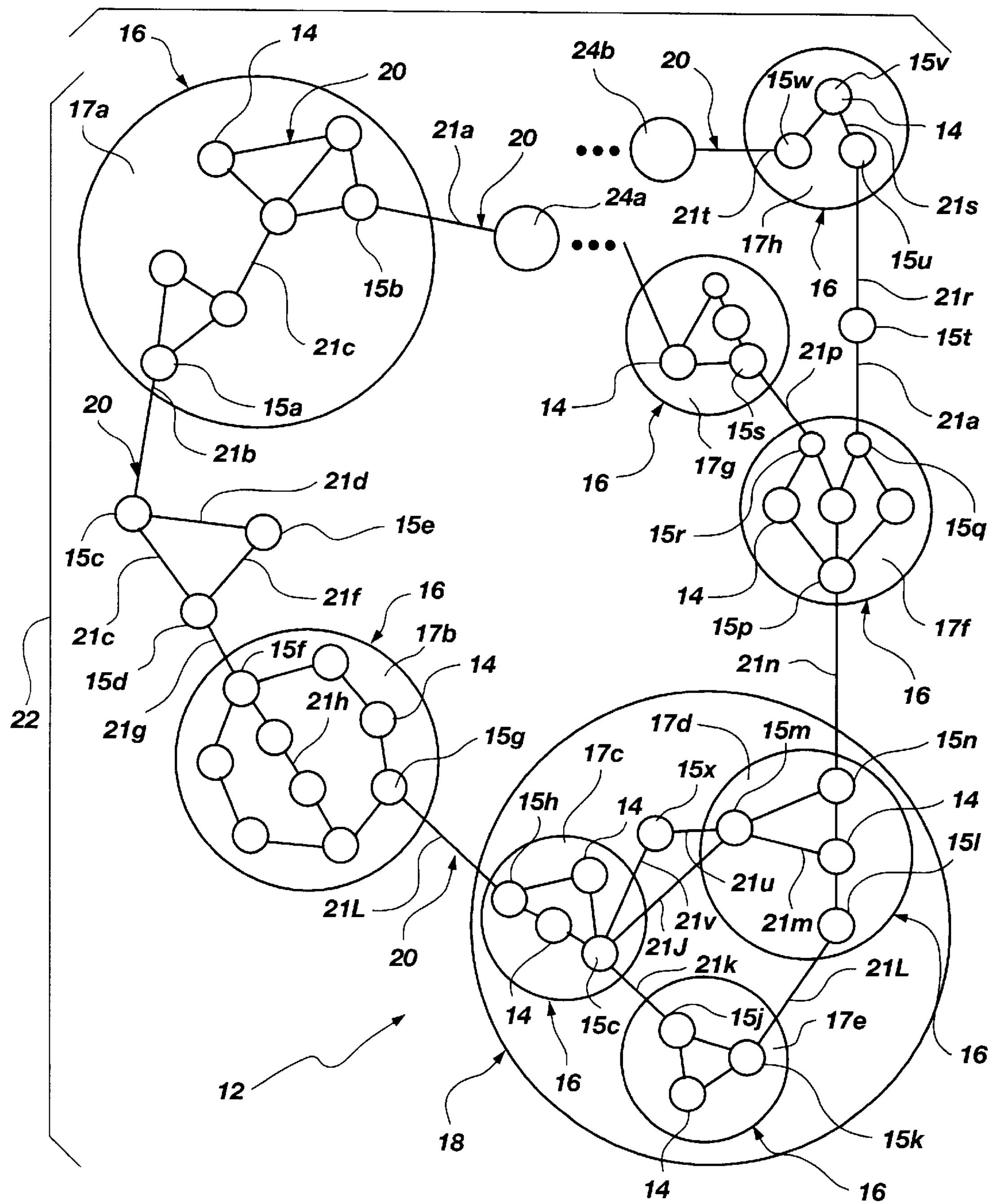
FIG. 3 is a schematic block diagram representing several nodes, granules and their connections in a system to be governed by an apparatus and method in accordance with the invention.

In general, the granule 16 and granule 18 may be thought of as a molecule 16 and super-molecule 18, respectively. In the granule definition method 36, a method is provided for determining a logical agglomeration of nodes 14 into granules 16 or molecules 16, and for agglomerating granules 16 into larger granules 18 or super-molecules 18. Thus, in general, any granule 16 may contain some number of nodes 14 or atoms 14, while any granule 18 or super-molecule 18 may be comprised of molecules 16 or other super-molecules 18. Nevertheless, as illustrated in FIG. 3, a super-molecule may be an agglomeration of molecules 16 and atoms 14. For example, the super-molecule 18 contains molecules 17*c*, 17*d*, and 17*e* in association with an individual atom 15*x* or node 15*x*. Thus, some cognitive understanding must be provided in the granule definition method 36 in order to provide a method for granulation of the individual nodes 14, molecules 16, and super-molecules 18.

For example, the granule definition method 36 may include an image filter provided with a knowledge of a space in which the managed system 12 exists. Moreover, the image filter may contain the rules under which all individual nodes 14 or granules 16, 18 operate. For example, in Example II below, the edge logic operates as an image filter by providing a function zeta. Thus, the function zeta provides an outline of an image or feature to be extracted from a larger image or object. Once extracted, the individual feature may then be saved as a separate object.

Although a human may provide the granule definition method 36, an automatic cognitive process may be programmed to routinely perform the function of granule definition 36.

The node feedback thread 46 collects information concerning the load on any particular node. The node feedback thread 46 may be referred to as granule feedback 46. However, as a practical matter, loading is associated with individual edges 20 connecting nodes 14 in granules 22 (see FIG. 3). Thus, in general, the node feedback thread 46 may provide data from a variety of tracking processes 48 monitoring threads 48. The current loading data for each node 14 in each granule 42 within a connected graph 13 or network 13 (see FIGS. 3–5) may be provided by the node feedback thread 46.

The path finder 50 has the functional responsibility to exercise the algorithm detailed in Example I. The path finder may receive data 28 from the load space 32 in order to solve the path problem and provide a best path. The path finder 50 may be engaged by a request thread 52 communicating request data 76 or a request message 76 identifying an initial x granule 170 (see FIG. 5) and a destination or terminal y granule 172. in response to the request 76, the path finder 50 exercises the path algorithm described in Example I to find the best path between the granule 170 and the granule 172. The path finder outputs a solution 80 or path definition 80 which may then be used by a send thread 54 to send the message associated with the request thread 52 along the path found by the path finder 50 and output as the path definition 80.

The request thread 52 has the functional responsibility to provide a request 76 to the path finder 50. For example, the request 76 may be thought of as a requirement to find a path for routing a message.

The send thread 54 has the functional responsibility to send a message on a "pretty good" path through a network 12 or managed system 12. The message is sent along a path defined by the path finder 50. The path is provided to the send thread 54 in the message 80.

In FIG. 1, the initialization data 68 or the message 68 containing the initialization data is shown as a dotted line. This is because the message 68 is typically sent relatively seldom. For example, the granule manager 42 provides the initialization data 68 to the vacuum space manager 40 in order to create the record sets 29*a* in the vacuum space 30. However, unless new nodes 14, not formerly part of a managed system 12, are added, then the data sets 29*c* must be updated in the granule space 34, as well as the record sets 29*a* in the vacuum space 30. In such an event, the granule event manager 42 may send a message 68 to the vacuum space manager 40. Otherwise, the granule event manager may be occupied primarily with sending load data 70, or the message 70 containing load data, to the load manager 44 in order to update the record sets 29*b* in the load space 32.

Figure 2:
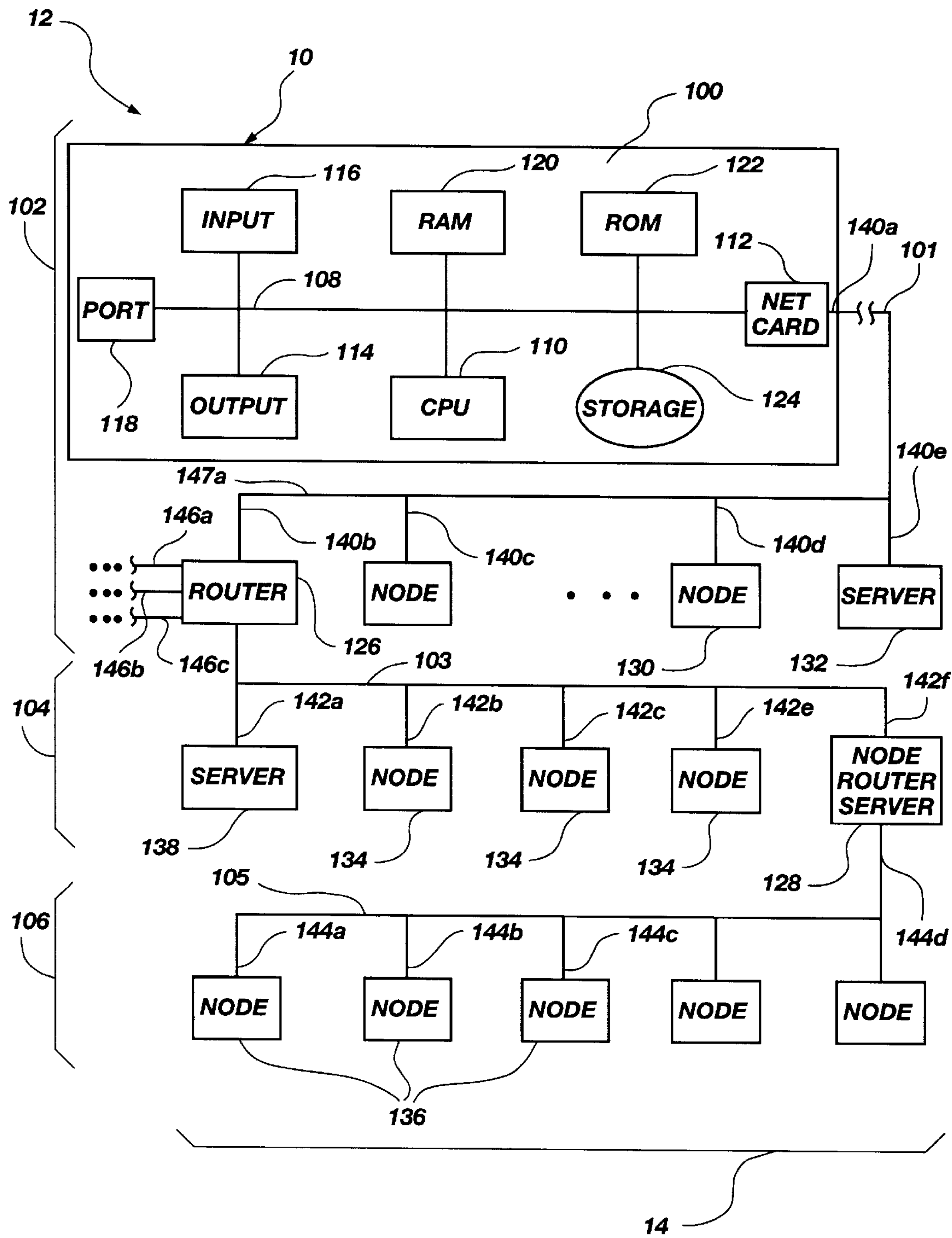
FIG. 2 is a schematic block diagram of one embodiment of a hardware suite that may be used to implement an embodiment of the invention.

Referring now to FIG. 2, a managed system 12 or internetwork 12 may include a plurality of networks 102, 104, 106, 146*a*, 146*b*, 146*c*. The managed system 12 may be configured as a plurality of granules 22 as determined by a granule manager 38. The apparatus 10 or management system 10 may be represented as an individual node 100 or management system 100 containing hardware components for hosting the threads 39 and data structures 31 of the management process 11.

The threads 39 may be distributed across multiple CPUs 110 in the nodes 100, 130, 134, 136. Similarly, the data structures 31 may be distributed across the RAM 120, the ROM 122, or the storage devices 124 in the node 100 or in any other node 130, 134, 136. Nevertheless, for the sake of simplicity of description, the apparatus 10 may be described to have the threads 39 operating in a single CPU 110 or processor 110 with each of the data structures 31 being a component memory block 31 in RAM 120 or memory device 120.

A node 100 serving as or hosting a management system 10 may include a bus 108 connecting a CPU 110 with a network card 112. The bus 108 may also connect to an output device 114 for interacting with another machine or device, another node 14, or a human being. For example, an output device 114 might include a printer, a monitor, a gauge, or the like.

Likewise, the bus 108 may connect to an input device 116 for interacting with another device, another node 14, another granule 16 (of any size or configuration, to include super-granules 18) or a human being. For example, an input device 114 might include a keyboard, a mouse, a touch screen, or the like for providing inputs to the management system 10.

Random access memory (RAM) 120 may be provided for temporary storage of information as data provided to and from the CPU 110. Similarly, read-only memory (ROM) 122 may be provided for storing parameters not requiring changes. A storage device 124 may be connected to the bus 108 for providing permanent or non-volatile storage for the coding making up each of the threads 39, as well as the data structures 31. Ports 118 may be added to the bus 108 for connecting peripheral devices of any desired type or configuration.

The network 102 and network 104 are connected by a router 126. A backbone 101 connects the individual nodes 130, the router 126, and the management system 10 to one another. Each node 130 contains a connector 140, illustrated in FIG. 2 as the connections 140*a*, 140*b*, 140*c*, 140*d*, 140*e*. Although a daisy chain arrangement is illustrated, for example, as a connective scheme between the networks 102, 104, 106, a star network, or a star internetwork comprising the networks 102, 104, 146*a*, 146*b*, 146*c* may be configured, for example, around the router 126. Other network configurations may operate equally well relying on pathfinding by the management system 10. Thus, an apparatus and method in accordance with the invention may operate on virtually any network topology.

Likewise, as a practical matter, any node 130 might serve as a router 126, and the router 126 may be regarded as a node 130. Similarly, a server 132 is also a node 130, but is simply programmed to have specific functionality. The network 104 may include nodes 134, of which one node 134 may be configured as a server 138 or as a router 128 and server 128. In each network 102, 104, 106 the nodes 130, 134, 136, respectively, may connect to a backbone 101, 103, 105, respectively.

A connection 20 (see FIG. 3) or edge 20, between a node 126 and a node 100 will involve a connector 140*a* between the node 100 and the backbone 101. Likewise, the connector 140*b*, as well as the node 100, may be included in the data 28 in the data structures 31 corresponding to the system 12 of which the nodes 126 and 100 form a part. This condition presents no problem for the management system 10, since each element 14 or node 14 at an atomic level in the connected graph 13 corresponding the managed system 12 may be consistently and persistently named.

For example, in a network 12, (see FIG. 2) several smaller networks 102, 146*a*, 146*b*, 146*c* may connect to a single router 126. If each of the networks 102, 1461, 146*b*, 146*c* is represented as an independent granule 22 at the same level, all those granules 22 include the router 126 as an atomic level node. However, the record sets 29 (See FIG. 1) reflect the topology of the network 12 at an atomic level (e.g. level 0, record set 82). Therefore, every atomic level node 14 (e.g. router 126) may be properly accounted for, even if it is agglomerated into several different granules 22 at a single level. If granules 22, sets of nodes 14, are represented by Venn diagrams, intersections of sets are tolerated by the management system 10.

In an apparatus and method in accordance with the invention, the router 126 may report to the management system 10 or apparatus 10 traffic conditions associated with both the network 102 and the network 104. That is, the granule event manager 42 may be a thread operating in the CPU 110 of the apparatus 10. The router 126 may report (as a node 14) information to different instantiations of a granule event manager 42 pertaining to different networks 102, 104, 146*a*, 146*b*, 146*c*.

One may note that in one embodiment of an apparatus in accordance with the invention, a router 126 may report only zero level or atomic level information pertaining to specific nodes 14 (e.g. nodes 130). The granule event manager 42 may then abstract the atomic level or zero level event information to form higher levels of abstraction (e.g. level 1, level 2, level 3 molecular agglomerations).

For a situation where the node 100 and the node 126 are individual granules 122, an edge 147*a* may be defined as the connector 140*b*, the backbone 101 between the connector 140*b* and the connector 140*a*, and the connector 140*a*. As a practical programming matter, the influence of the node 100 and the node 126 on the load through the edge 147*a* or connection 147*a* may actually be mapped to the edge 147*a* insofar as the data structures 31 are concerned.

For example, the bandwidth of a connection 147*a* or edge 147*a* between a router 126 (node 126) and a node 100 may be affected by the bandwidth of a CPU 110, the network card 112, the connector 140*a*, the backbone 101, and the connector 140*b*, as well as the bandwidth of the router 126. In the vacuum state or in the absence of any activity from the nodes 130 corresponding to the connections 140*c*, 140*d*, 140*e*, the bandwidth of the edge 147*a* may be defined.

Nevertheless, with activity in one of the nodes 130, 132 connected to the backbone 101 by the connectors 140*c*, 140*d*, 140*e*, the bandwidth of the backbone 101 may be affected. Thus, the available bandwidth or effective bandwidth for communication along the edge 147*a* may be affected.

Similarly, interconnection between any node 130, 134, 136 in any network 102, 104, 106, 146*a*, 146*b*, 146*c*, may affect the bandwidth on any edge in the system. Nevertheless, an edge 20 need not influence another edge, but the foregoing example illustrates in one simple arrangement, how the interdependence of the loads as represented by the record sets 29*b* in the load space affect one another.

Similarly, the connections 142*a*, 142*b*, 142*c*, 142*e*, 142*f* to the backbone 103 may be accommodated in various paths between the appropriate nodes 20 and nodes 134 in the network 104. Similarly, the connectors 144*a*, 144*b*, 144*c*, 144*d* associated with the backbone 105 and the nodes 136 may have effects on messages over edges 20 having some relationship to the nodes 136, the router 128, or the like in the network 106.

In the foregoing example, each of the nodes 14 is treated as an individual granule 22. Nevertheless, as illustrated in FIG. 3, one or more nodes 14 and one or more networks 102, 104, 106, for example, may be agglomerated into one or more granules 22.

Referring now to FIG. 3, a connected graph 26, a specific example of a connected graph 13, may be used to represent a managed system 12. The system 12 may contain nodes 14 (for example, in a computer sense) or atoms 14 connected by edges 20. Correspondingly, a connected graph 26 may have nodes 22 (in a mathematical sense, as explained in Example I) that are represented as granules 22, in general, here. Thus, granules 22 may contain any number of nodes 14. In this instance, the nodes 14 are defined in a physical sense, such as might characterize a work station, or a pixel, and so forth, among a large group or network 12 of similar units.

An edge 20 may be thought of as a connection 20 between two nodes 14 (in a network sense) having some defined relationship across the edge 20. Each of the nodes 14 may be include in a granule 22, such as the granules 16, 18, or may be a granule 22 itself.

In general, an edge 20 may be regarded as a connection between any pair of nodes 14, or granules 22. In the example of FIG. 3, each of the nodes 15*a*–15*x* is connected to an adjacent node 14. For example the edges 21*a*–21*v* interconnect various nodes 14, including the nodes 15*a*–15*x*.

However, each of the granules 16, 18, such as the granules 17*a*–17*h*, is also connected by one of the edges 14 associated with a node 14 within the granule 16, 18 in question. For example, the edge 21*i* connects the granules 17*b* and 18, while the granules 17*h* and the node 15*t* connect through the edge 21*r*. Thus the node 15*t* is also a granule 15*t*, while the granule 17*c* is within the granule 18.

The granules 17*a*–17*h* (molecules) may be agglomerations of some number of nodes 14 (atoms). The granules 18 (supermolecules) may each be an agglomeration of nodes 14, like the node 15*x*, as well as granules 17, like the granules 17*c*, 17*d*, 17*e*.

All granules 22 may not be under the purview of a management system 10 responsible for pathfinding in the managed system 12 of FIG. 3. For example, the primitive granules 24*a*, 24*b* are shown as connecting to the world outside, and may represent any number of nodes thereof. However, to communication with the primitive granules 24*a*, 24*b*, the granules 17*a*, and 17*h* need only treat the primitive granules as they might treat the granules 15*t* and 15*c* (nodes as granules in this example), respectively.

Figure 4:
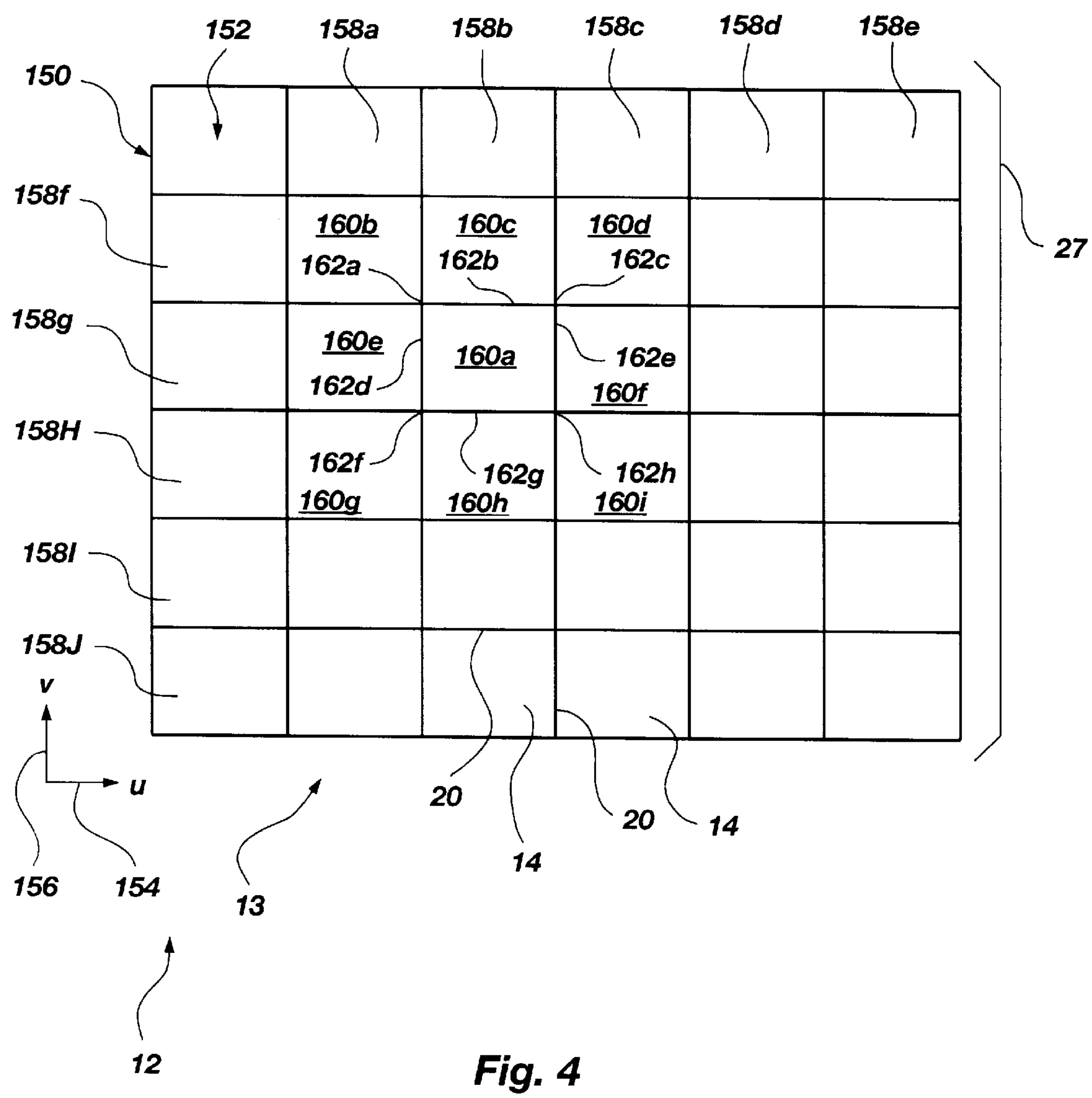
FIG. 4 is a schematic block diagram of an embodiment of a graphical apparatus in accordance with the invention.

Referring now to FIG. 4, an apparatus and method in accordance with the invention may be configured as a uniform grid 150. The uniform grid 150 may be comprised of tiles 152 overlying and underlying domain. The uniform grid 150 may be defined in terms of a u direction 154 and a v direction 156. The uniform grid 150 may represent individual pixels on a screen of a computer, or any ordered set of elements organized in a cartesian system. Such as grid may be regarded as a quantization of a continuous metric space as defined in Example I. Individual tiles 152 may be thought of as mathematical nodes, or granules 22, although each is also an individual node 14.

Between individual nodes 14 are provided connections 20 or edges 20. The edges 20 are defined in terms of the relation existing between proximate nodes 14 sharing an individual edge 20. Thus, in the example of FIG. 4, individual pixels 158, the generic description or term for each of the pixels 158*a*–158*j*, may be thought of as a node 14. In the example, a node 160*a* may be surrounded by eight neighboring nodes 160*b*, 160*c*, 160*d*, 160*e*, 160*f*, 160*g*, 160*h*, 160*i*. The node 160*a* shares with these neighboring nodes 160 the edges 162*b*, 162*c*, 162*d*, 162*e*, 162*f*, 162*g*, 162*h*, 162*i*, respectively.

The relationship of adjacency may be defined as the edge 162 between the node 160*a* and a neighboring node 160*b*–160*i*. Refer to Examples I and II. Example II addresses a uniform grid 150 as the connected graph 13 of the managed system 12 to be managed by an apparatus 10.

Since the uniform grid 150 exists in a cartesian coordinate space, the costs, weights or distances associated with each edge 162, are very uniform. Nevertheless, referring to Example I below, the more complex and extensive topology of the network 12, represented by the graph 26, may still be handled or solved using the algorithm illustrated in Example I and implemented in the apparatus 10 in FIG. 1.

An edge, in a mathematical sense, may be thought of as a connection. A connection may actually be a relation. For example, in Example II, and as illustrated in FIG. 4, boundaries 162 exist between pixels 160. Each boundary represents an adjacency. The mathematical principal of edge may be regarded as a definition of adjacency. Thus, in a "graph-theoretic" sense, edge means adjacency between mathematical nodes, like pixels 160. In Example II, the edge is sometimes referred to as an edge in a visual sense. That is, for a feature that is desired to be extracted from an overall image, an edge represents the physical edge of the visual feature. In order to find or define this edge, or boundary, of the visual feature, a mechanism is designed to distinguish the edge or boundary. The mechanism may be a functional value of gray scale, an interpretation of color. Since a functional value, a specific gray scale for one pixel or the comparison of the gray scale value of one pixel versus the gray scale value of another pixel, the location of an edge or boundary may be difficult. However, as explained in Example II, a rate of change of gray scale across several adjacent pixels may be a much better indication of the presence of a visual boundary. Moreover, the second derivative, the rate of change of the gray scale across several pixels, has been demonstrated to provide an even better indication of a visual boundary or a physical edge of a visual feature. As explained in Example II, in an embodiment of an apparatus and method in accordance with the invention, either a functional value, gray scale value associated with a pixel, a comparison of gray scale values between adjacent pixels, or some comparative rate of change across adjacent pixels may be used to define a physical edge of the visual feature in question. Thus, the mathematical definition of an edge is a connection between nodes within a graph. Nevertheless, Example II also refers to the physical edge of a visual feature as an edge, which should be distinguished from a mathematical edge. Nevertheless, the definition of an edge should be entirely clear from the context.

Referring again to FIG. 4, individual pixels 160*a*–160*i* may be thought of as nodes. Actually, all pixels 158*a*–158*j* are nodes as well. By defining the adjacency feature at the boundaries 162*a*–162*h*, an edge may be defined. Thus, nodes 14 and edges 20, as illustrated in FIGS. 1–3, may be defined for the graph 150 or uniform grid 150 of pixels 158, 160. Thus, the pixels 158, 160 form one instantiation of the nodes 14 of FIG. 3.

Figure 5:
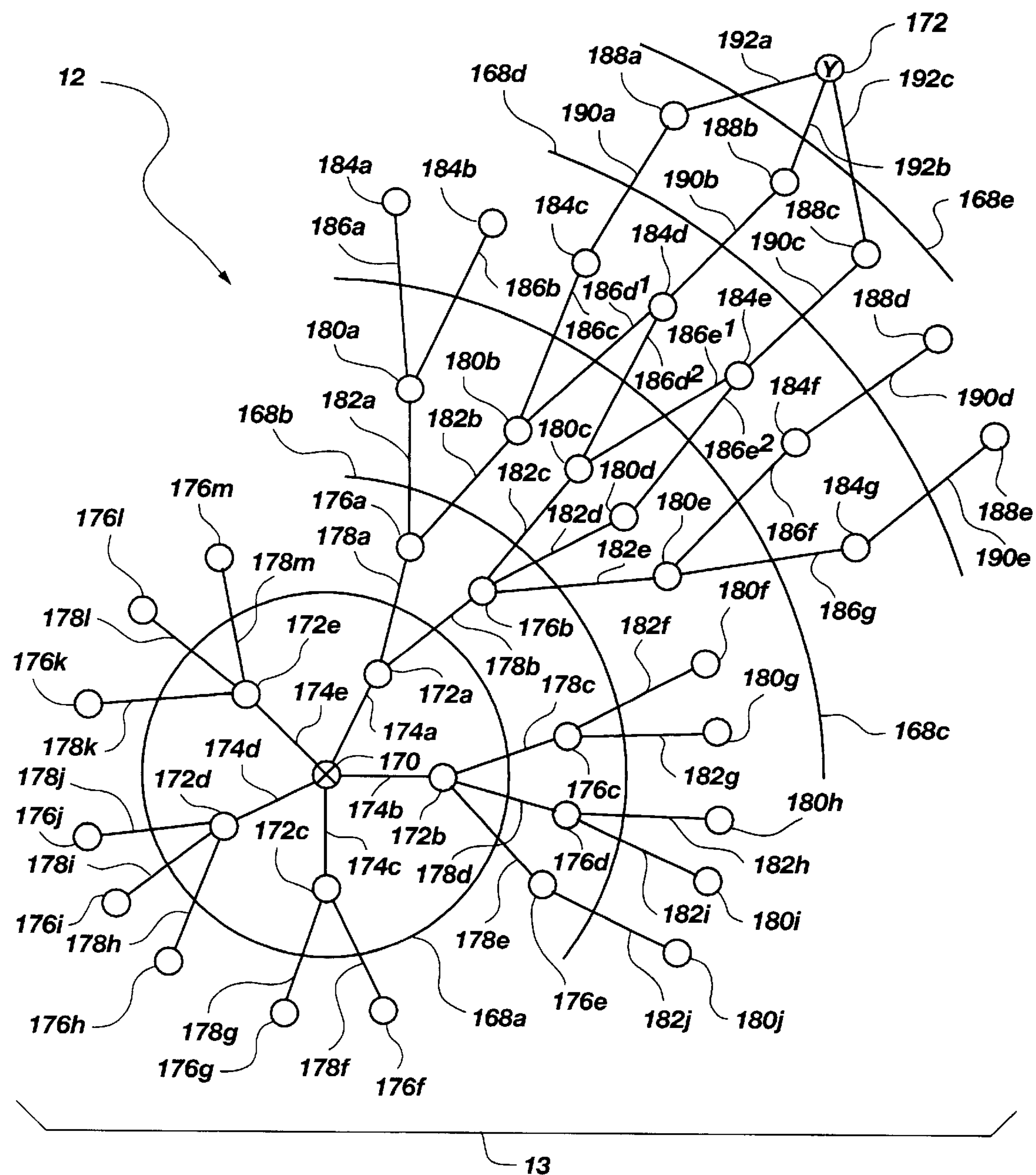
FIG. 5 is a schematic block diagram of one embodiment of an advancing wavefront method applied to a network as a connected graph in accordance with the invention.

Referring now to FIG. 5, a managed system 12 or network 12 may have a granule x 170 serving as a source of a message. A destination for the message may be a granule y 172. As discussed previously, the granules 170, 172 may ultimately send the message in question to the individual node 14. In fact, the granule 170 may be an individual node 14, a molecule 16, a super-molecule 18, or the like. Likewise, the granule y 172 may conform with any of the foregoing options. The apparatus 10 or management system 10 may be implemented in any individual node 14 of any individual granule 22, or within some distributed set thereof within the managed system.

According to the methodology of Example I, the apparatus 10, or the process 11, may be invoked to find a best path between the granule 170 and the granule 172 by analyzing the system 12 as a connected graph 13. Relying on the methodology of Example I, and the method 11 illustrated in FIG. 1, a series advancing wave fronts 168 may be used. Of the wave fronts 168, the wave front 168*a* and partial wave fronts, or wave fronts 168*b*, 168*c*, 168*d*, and 168*e*, illustrate an intelligent reduction of the total choices of paths or of edges 20 in order to find a pretty good or near-optimal path. Within the wave front 168*a*, the granule 170 shares the edges 174*a*–174*e* with the respective granules 172*a*–172*e*, respectively.

To determine which of the edges 174*a*–174*e* will be kept, the path finder 50 evaluates each of the edges 20 intersected by the advancing wave run 168*a* and outside of the granules 172*a*–172*e*. Thus, each of the edges 178*a*–178*m* corresponding to the granules 176*a*–176*m*, respectively, is evaluated. That is, a measure, distance, as explained in Example I, is determined for each of the edges 178, assuming that a corresponding granule 172 and edge 174 are the only available paths from the granule x 170.

Depending upon the evaluation of the net path corresponding to any granule 172, granule 176, and intermediate edge 178, in combination with the underlying edge 174 between the granule 172 in question and the granule x 170, a determination is made. That determination selects only a certain limited number, also indicated as a size limit of the support, which corresponds to a selected number of granules 172 and granules 176 that will be kept for the next iteration.

Thus, although each of the edges 178 is evaluated, the evaluation has the purpose of evaluating the expected cost, distance, or other metric, associated with respective, edge 174 to advance toward the granule y 172 away from the granule 170. In FIG. 5, the granules 172*c*, 172*d*, 172*e* are eliminated from further evaluation or consideration beyond the evaluation of the edges 178.

In the next iteration, represented by the advancing wave front 168*b*, each of the edges 182 intersected by the advancing wave front 168*b* in the schematic representation of FIG. 5, is evaluated in order to determine each of the effective path lengths to be expected by a combination of an edge 174, a granule 172*a*, an edge 178, a granule 176, an edge 182, and a granule 180. For example, each of the edges 182*a*–182*j* may be a potential future path from one of the corresponding granules 176*a*–176*e*, as illustrated in FIG. 5.

In a specific instance, an edge 182*c* is evaluated as a potential future path from a granule 176*b* to a granule 180*c*. Similarly, an edge 182*i* is evaluated as a potential path or path segment from a granule 176*d* to a granule 180*i*. In this situation, the granule 172*b* may remain in a potential path, as may a granule 176*c*, with their intervening edge 178*c*, while the granules 176*d* and 176*e* may be dropped from consideration.

On the other hand, the granule 176*b* along with its edge 178*b* and underlying or previous granule 172*a* remain in consideration for inclusion in a potential path, by virtue of the favorable potential edges 182*c*, 182*d*, and 182*e*. The wave front 168*c*, similarly, reduces the selection of granules 180*g* under consideration by evaluating each of the edges 186*a*–186*g* and each of the granules 184*a*–184*g*. The wave front 168*d* or partial wave front 168*d* invokes only consideration of the edges 190*a*–190*e* and corresponding granules 188*a*–188*e*. The resulting paths, considered with application of the advancing wave front 168*e* include only the paths that include the granules 188*a*, 188*b*, 188*c*, and the corresponding edges 192*a*, 192*b*, 192*c*, respectively, shared with the granule y 172.

Thus, an apparatus and method in accordance with the invention, may operate to provide a limited, advance, view of a potential path superimposed over the accepted paths that have been included in the pruned set of granules 22 and associated edges 20. By continuing to reduce each wave front 168 in turn, the apparatus 10 and process 11 maintain a sufficiently small data structure 31 for the vacuum space 30, load space 32, and granule space 34 that the threads 39 may operate efficiently on a node 100 of modest capability. This is particularly important, since the distances, speaking of the expression distance as discussed in Example I, as applied an individual edge 20, between any adjacent pair of granules 22, may be dynamically changing. Any snapshot of data 28 representing a state of a managed system 12 or connected graph 13, will be in error before it is reported and recorded.

The method of the advancing wave fronts 168, or the partial wave fronts 168*b*, 168*c*, 168*d*, 168*e* corresponds to the process of super position and reduction explained in Example I.

The architecture illustrated in FIG. 1 may be embodied in several desirable forms. For example, Example II contains one implementation of path finding along a boundary of a visual feature in a cartesian geometry. As another example, pseudo code implementation of the threads 39 of FIG. 1 are presented here.

```
                    ********************************
                         GRANULE EVENT MANAGER
notDone = TRUE;
While (notDone) {
    Get Message();
    Switch (messageType) {
        case capacity:
            ReadGranuleStore(granuleSpace);
            ResolveVacuumMessages(granuleSpace;
                                message,
                                vacMessages);
            for (i=0; i<=numberOfVacMessages) {
                storeMessage(vacMessages[i]. messageID);
                SendMessageToVacuumMngr(vacMessages[i]);
                }
                break;
        case load:
            ReadGranuleStore(granuleSpace);
            ResolveLoadMessages(granuleSpace,
                                message,
                                loadMessages);
            for (i=0; i<=numberOfLoadMessages) {
                storeMessage(loadMessages[i]. messageID);
                SendMessageToLoadManager(loadMessages[i]);
            }
            break;
        case messageAck:
            DeleteFromStore(messageID);
            break;
        case idle:
            while (messageStoreNotEmpty) {
                ReadMessageStore();
                if (noAcklnGoodTime){
                    switch (messageType) {
                        case capacity:
                        SendMessageToVacuumManager();
                        break;
                        case load:
                        SendMessageToLoadManager();
                        break;
                        default:
                        break;
                    }
                }/* noAcklnGoodTime */
            }
            break;
        case done:
        notDone = FALSE;
        break;
        default:
            log("invalid message");
            break;
    }
}/*while */
                    ********************************
                            LOAD MANAGER
notDone = TRUE;
While (notDone) {
    GetMessage():
```

-continued

```
    if (messageType == load){
        ReadVacuumStore(vacuumSpace);
        ReadLoadStore(loadSpace);
        ComputeNewLoads(vacuumSpace, loadSpace);
        WriteLoadStore(loadSpace);
        SendAck();
    }
    else if (messageType == done){
        notDone = FALSE;
    }
    else{
        log("invalid message");
    }
}/* while */
                    ********************************
                        VACUUM SPACE MANAGER
notDone = TRUE;
While (notDone) {
    GetMessage();
    Switch (messageType) {
        case capacity:
            ReadVacuumStore(vacuumSpace);
            ComputeNewVacuum(vacuumSpace);
            WriteVacuumStore(vacuumSpace);
            SendAck();
            break;
        case getOSpace:
            ReadVacuumStore(vacuumSpace [0], 0);
            SendToGranuleManager(vacuumSpace[0]);
            break;
        case makeOrEditLevel:
            ReadVacuumStore(vacuumSpace);
            ComputeNewVacuum(vacuumSpace message);
            WriteVacuumStore(vacuumSpace);
            SendAck();
            break;
        case done:
            notDone = FALSE;
            break;
            default:
            log("invalid message");
            break;
    }
}/* while */
                    ********************************
                          GRANULE MANAGER
AskFor0Store();
ReadGranuleStore();
notDone = TRUE;
while (notDone) {
    GetCommand();
    switch (command) {
        case edit:
            DoEdit();
            break;
        case saveGranule:
            SendGranuleToVacuumManager();
            WaitForAck();
            break;
        case done:
            notDone = FALSE;
            break;
        default:
            log("invalid command");
            break;
    }
}/* while */
                    ********************************
                             REQUESTOR
void RequestPath(x, y, level) {
    return PathFinder(x, y, level);
}
                    ********************************
                               SEND
/* Send along computed path */
notDone = TRUE;
while (notDone) {
    GetMessage();
    switch (messageType) {
```

-continued

```
        case store&forward:
            GetNextDest(message);
            if (noNextDest) {/* we have arrived */
                PermanentStore(message);
            }
            else {
                TempStore(message);
                SendToDest(message);
            }
            break;
        case messageAck:
            DeleteFromTempStore(messageID);
            break;
        case idle:
        while (tempStoreNotEmpty) {
            ReadTempStore();
            if (noAckInGoodTime) {
                SendToDest(message);
                }/* if noAckingoodtime */
            }
            break;
        case done:
            notDone = FALSE;
            break;
        default:
            log("invalid message");
            break;
    }
}/* while notDone */
                    ********************************
                              PATH FINDER
PATH PathFinder(x, y, level) {
    ReadLoadStore(loadSpace[level], level);
    initpaths(paths);
    notDone = notStalled = TRUE;
    white (notDone && notStalled) {
    Superposition();
    Reduction();
    }
    if (notStalled) {
        *return BestPath(paths);
    }
    else{
        return FindGeodesic(loadSpace[level], level);
    }
}
                    ********************************
                             NODE FEEDBACK
notDone = TRUE;
while (notDone) {
    GetMessage();
    switch (messageType) {
        case capacity:
            BroadcastCapacityInfo();
            break
        case idle:
            if (LoadDeltaExceedsThreshold()) {
                BroadcastLoadInfo()'
            }
            break;
        case done:
            notDone = FALSE;
            break
        default:
        log("invalid message");
        break;
    }
}/* while */
                    ********************************
                          INIT STATE REQUEST
```

BroadcastRequestForCapacities();

As an additional insight, the data structures 31 may be understood by referring to Example I. In Example I below, the matrix $G_s$ may be thought of as a model for a geometry in a metric space. The metric space may be modeled as a finite graph, a well-known mathematical object as understood in the sub-discipline called graph theory.

A finite graph contains several nodes, connected by edges between the nodes. At each edge one then may define a vacuum state or an unloaded capacity. Alternatively, the vacuum state at any edge may be thought of as the measure representing the cost, distance, or the like associated with traversing the graph along that edge in the vacuum (no-load, base, unloaded, ground) state.

A model illustrating all nodes connected by edges with assigned measures for each edge may be represented as data, that may be thought of as the vacuum state data. This vacuum state data may be stored in the vacuum space of the memory device that holds the vacuum space.

Given the vacuum data stored in the vacuum space, one may construct a representation of a geometry, where the geometry defines a ranked or ordered list of all edges $e_i$ associated with a node X by which a path may progress from X to a remote node Y. Not all paths to Y are included. The best path extant from X to Y, exiting initially from X across that edge $e_i$ is determined as if no other edge were available. Returning to X is not permitted. The best cost in the metric, associated with the best path, initiated through the edge $e_i$, is determined and associated with that edge $e_i$.

This geometry may be used to define a generalized direction for leaving a node X. The calculation of the geometry may be a substantial computational load for a processor. Therefore, in an apparatus and method in accordance with the invention, the geometry may be calculated very seldom with respect to the recalculation or updating of load data in the load space. The individual bits making up load data may be received, stored, processed, etc. independently, individually, and asynchronously because each load may be associated with a single edge.

In an apparatus 10 in accordance with the invention, a load manager 44 may incorporate state information received from an event manager into load data corresponding to several affected edges associated with data in the load space. For example, several edges may be affected by traffic or activity in a single node connected by the edge in question. Thus, the measure (e.g. cost) associated with a particular node may be influenced by a change to any load or capacity change in any of the several edges and nodes at the opposite sides of those edges.

The reader is referred to Example I, where the domain D may be thought of as the sum of the elements in a record 81 in the vacuum space 30 added to the elements in a record 90 in a load space 32. Alternatively, the summations that the domain D (in Example I) represent could be stored in the load space 32. Thus the load space 32 stores data corresponding to an indication or representation of a dynamic loading of the system of nodes 14. In Example I, the domain D is used to represent the sum of the vacuum state and the load state, where the load state is an increment. In FIG. 1, the load space may be used to store either the Domain D, or the zeta increments.

The value of a zeta may be thought of as an incremental factor for increasing or decreasing the value of omega, where omega is the vacuum measure. That is, the measure (cost, distance, load, or the like) in the topology associated with a metric when the system is in a unloaded state is the vacuum measure. Therefore, the vacuum measure may be stored in a vacuum space 30, while the load zeta may be stored in a memory device at a location allocated as a load space 32 in FIG. 1.

EXAMPLE I

A Path-Finding Method

The invention may rely on an algorithm for finding a pretty good (near-optimal) path between any two points (x, y) in a general metric space, in the presence of local metric distortions that are variable in space and time. By "path" is meant a finite, ordered set of unique points with y as the first and x as the last element of the set. By "pretty good" is meant a relatively short path length; that is to say longer paths are "less good" and shorter paths are "more good". The terms "short" and "long" must be defined for each metric space under consideration.

For brevity we shall refer to the algorithm as ℵ. Ideally, ℵ would find the "best" path (provided such a path exists). But our claim is not that strong—we opt for finding a pretty good path through a (possibly) shifting landscape. To do this, ℵ requires a-priori knowledge of a discrete model of the metric space with no local distortions, i.e. a discrete model of the vacuum. The discrete vacuum model provides a "ground state" metric from which we derive the global geometry. The geometry in turn gives the rules for discrete motion in the vacuum. With a discrete model and associated global geometry established, ℵ can then receive as input two distinct points in the space, along with asynchronous, point independent updates to local metric distortions and produce a pretty good path, in the face of a changing local metric. In function notation, $\rho=\aleph((x,y),\zeta)$, where ρ is a (pretty good) path, x and y are two distinct points connected by ρ, and ζ represents our present knowledge of the local distortion of the metric at every point in space (each point independently and asynchronously updated).

The Discrete Model: the Domain of ℵ

Let $(A, d_A)$ be a metric space. S may be a partition of A into bounded, convex disjoint regions that tile A (except perhaps on a set of zero measure). Suppose that there exists $\epsilon>0$ such that for any region, the least upper bound (lub) of $\{d_A(x,y)\}>\epsilon$ for all x, y elements of the region. In other words, we partition A with a kind of grid. If one can find a grid that partitions A in such a way that, 1) S has countably many elements, and any element (point) of S has only finitely many adjacent neighbors, 2) any two points in S are connected via some finite sequence of adjacencies and 3) there is adequate resolution for the problem of interest, then one may call S a discrete partition of A. Of course, if A is already a discrete topological space meeting conditions 1 and 2, then define S=A (e.g., a network definition).

One may think of adjacency in terms of point connectivity, such as edges between nodes in a graph. One may quantize A in such a way that S can be represented as a graph. One may use the term "edge" in the graph theoretic sense to mean "adjacency in S", and we implement the discrete partition S as a connected graph. Nodes of the graph may correspond to "points" (equivalence classes; multiple-to-one mapping) of S that correspond to disjoint regions (under the partition) of A. Edges of the graph connect points of S corresponding to regions of A that share one or more boundary points (boundary in the $d_A$ topology).

To each edge e there corresponds a positive real number $\omega_e$, which represents the vacuum measure between the two endpoints connected along that particular edge. Vacuum measure may mean that $\omega_e$ is derived from the metric on A subject to no local metric distortions. For example, if edge e connects the two points u and v in S, one may define $\omega_e$ as the limit point $\omega_e=\text{lub}\{d_A(x,y)\}$, as x and y independently range through all points in A that map to u and v, respectively, in S. But however we derive $\omega_e$ from $(A, d_A)$, it is important to realize that the set of all $\omega_e$ is part of a measure in S, not a distance, even if it were derived from distance in A.

As a bookkeeping device, define the edge $e_0$ which connects every point to itself. The measure $\omega_{e0}=0$. It is the only edge with measure zero. For any two points x, y ∈ S, let ρ be a finite, ordered list of ordered pairs $(s_n, e_n)$: $\rho=\{(s_1,e_1), (s_2,e_2), (s_3,e_3), \ldots (s_k,e_0)\}$. Here, $s_n$ is unique, $e_{n-1}$ connects $s_{n-1}$ to $s_n$ $(1<n\leqq k)$, $s_1=y$, and $s_k=x$. Call ρ a path from x to y, and define its length to be $$l_\rho = \sum_k \omega_{ei}.$$

Call k the cardinality of the path ρ.

One may now define $d_s(x,y)$ as $\text{glb}\{l_\rho\}$ over all possible paths from x to y. Note that the distance $\text{glb}\{l_\rho\}$ is sufficiently well defined, so that $(S, d_S)$ is a discrete metric space, providing a global geometry for ℵ.

Orientation in Space:

To implement the "global geometry" of the metric space $(S, d_S)$, one might consider some finite domain of S. Such a consideration is often not a problem when modeling some bounded, convex region of A, a closed bounded space A, or a finite space A.

Given a finite space, S, consider two distinct points x, y in S. The "shortest" distance between x and y is $d_S(x,y)$. But, $d_S(x,y)$ was defined in terms of path length: $d_S(x,y)=\text{glb}\{l_\rho\}$. Let $\rho_m$ be a path associated with $d_S(x,y)$ If more than one path qualifies, one may be selected based on any criterion of convenience. One may call the path $\rho_m$ the geodesic for (x,y).

Suppose x has k connecting edges; $e_1, e_2, e_3, \ldots e_k$. Consider the geodesic for (x,y) relative to $e_n$, $1\leqq n\leqq k$; i.e. as if only $e_n$ connected x in the graph. If no geodesic exists for an edge e, then e represents an undefined motion with respect to (x,y). The path length associated with the geodesic relative to e is ${}^e d_S(x,y)$, a directed (x to y) quantity. Path lengths of undefined motions are effectively infinite.

A complete description of the global geometry is a list of all e relative geodesics in $(S, d_S)$. For S having finitely many points $\{s_1, s_2, s_3, \ldots s_N\}$, the array $G_S$, below, defines the global geometry.

$$G = \begin{array}{cccccc} s & 1 & 2 & 3 & \ldots & N \\ 1 & 0 & g_{12} & g_{13} & \cdots & g_{1N} \\ 2 & 0 & 0 & g_{23} & \cdots & g_{2N} \\ 3 & 0 & 0 & 0 & \ldots & g_{3N} \\ \vdots & \vdots & \vdots & \vdots & \vdots & \vdots \\ N & 0 & 0 & 0 & \ldots & 0 \end{array}$$

Note that $g_{jk}$, N>k>j may typically contain the information $\{{}^e d_S(s_j,s_k)\}$ for all edges connected to $s_j$, and $\{{}^e d_S(s_k, s_j)\}$, for all edges connected to $s_k$. With $G_S$, one can construct a geodesic between any two points in S. Also, $G_S$ provides an abstraction of the concept of direction. Under the impetus to fall "efficiently" toward some point y, every point in S has a local "sense" of direction with respect to y, as if in a LaGrangian rather than an Eulerian coordinate system.

Path Space: The Range of ℵ

Let a set ℘ be all paths between two (distinct, otherwise arbitrary) points x, y ∈ S. Let $\rho_1, \rho_2$ be two paths in ℘. Define the distance between $\rho_1$ and $\rho_2$ as $d℘(\rho_1, \rho_2)=|l_{\rho1}-l_{\rho2}|$. Since d℘ is reflexive, positive definite and satisfies the triangle inequality, the path space (℘, d℘) is very nearly a metric space. Properly speaking, a point in path space is not a path. It is an equivalence class. One may define the path space as (℘*, d℘*) where ℘* is the set of equivalence classes (of ℘ under d℘) and the attribute of definiteness is restored to d℘*.

$\aleph_S$ can be non-deterministic. Thus, if $\rho_1$ and $\rho_2$ were equivalent in path length, $\aleph_S$ may generate $\rho_1$ one time and $\rho_2$ another time. This aspect $\aleph_S$ may be resolved by probability, preference criteria, or can be disabled, so that path selection is deterministic.

Completing The Domain—The ζ Term

The space S represents A in the vacuum state, and from S may be derived a description of the curvature of A which has been called the geometry $G_S$ (relative to S). But $\aleph_S$ must find its way through S—as local distortions to the metric appear and change over time in a way that is essentially unpredictable. We represent the distortion at the edge e and at time t as $\zeta_e(t)$. For the time dependent measure at e, $\omega_e+\zeta_e(t)$, designate $\zeta(t)$ as the operator that asserts $\{\zeta_e(t)\}$ on S. That is, $D(t)=S+\zeta(t)$, where D is the time dependent domain of $\aleph_S$.

In practice, each edge in S may independently "publish" its local distortion to S (or some locally defined subset thereof) above some threshold value. For instantaneous transmission, $\aleph_S$ is invariant with respect to (source) position in space. For a "snapshot" of D at some time $t_0$, then $D(t_0)$ is consistent in that it represents the true state of the system at some time in the past for all of D.

$\aleph$ Strategy—Pruning ($\wp$, d$\wp$)

A path-finding procedure is needed for $\aleph$, given the connected, weighted graph S, the geometry $G_S$, and a transport layer that guarantees the propagation of ζe messages throughout S with no duplicate broadcasting.

General Strategy:

A single consistent set of rules $\mathfrak{R}$ when applied to some subset $\phi_n$ of $\wp$ may generate $\phi_{(n+1)}$, a subset of $\phi_n$. Thus, $\mathfrak{R}(\phi_n)=\phi_{(n+1)}$.

The generated subset $\phi_{(n+1)}$ may be constructed to "likely" contain the pretty good paths in $\phi_n$. $\aleph$ then may recursively apply $\mathfrak{R}$ to its own output, starting with $\mathfrak{R}(\wp)$, until the output is a single path ρ or until forward progress stops.

The Method of Partial Paths:

To find a pretty good (or near optimal) path from x to y, where x, y ∈ S, take a "snapshot" of the domain $D(t)=S+\zeta(t)$. Construct the partial path from x to y; s $^*\rho_1=\{(x,e_0)\}$.

Note that $\phi_1$, the set of all paths from x to y that are extensions of $^*\rho_1$, is $\wp$. Any x-edge e (some more costly than others to traverse) may extend $^*\rho_1$ as a path "toward" y. With the vacuum geometry $G_S$, the cost of each edge in D(t) may be balanced against whether the edge advances more or less "toward" y in the vacuum.

One can examine the incremental costs for all edges connected to x. One may use a strategy of Superposition and Reduction. Starting from $^*\rho_1$, one may propagate up to N concurrent partial paths by doing successive look-ahead/select operations on each partial path. Limiting the solution to N partial paths limits the "surface area" of the support of allowed trajectories from x to y. By "support" is meant the set $\{q_k\}$ of points in S associated with the endpoints of partial paths $\{^*\rho_k\}$.

Each cycle $\mathfrak{R}(\phi)$ extends the cardinality of the (up to) N partial paths by one. In the cycle the k'th partial path $^*\rho_k$ ($1\leqq k\leqq N$) briefly spreads out into a superposition state, moving along all allowed edges to adjacent points. For each possible look-ahead one may compute the cumulative cost by adding the edge cost $[\omega_{en}+\zeta e_n(t)]$, a "steering" term, and an optional inertial term to the cumulative cost for $^*\rho_k$.

The set C contains the cumulative look-ahead costs for all N partial paths, where $c_k$ is the cumulative cost for $^*\rho_k$, and $M_k$ is the number of edges along which motion is defined for the endpoint of $^*\rho_k$. Thus, $C=\{{}^1c_1, {}^2c_1, \ldots {}^{M1}c_1, {}^1c_2, {}^2c_2, \ldots {}^{M2}c_2, \ldots {}^1c_N, {}^2c_N, \ldots {}^{MN}c_N\}$, where ${}^nc_k$ represents the cumulative cost, were $^*\rho_k$ to be extended along $e_n$.

If higher look-ahead costs are associated with more likely partial paths. C may be a basis for a discrete probability distribution. One may think of a $$\sum_C ({}^nC_k)$$

sided die, with ${}^1c_1$ sides labeled "${}^1c_1$", ${}^2c_1$ sides labeled "${}^2c_1$", . . . and ${}^{MN}c_N$ sides labeled "${}^{MN}c_N$". One may normalize the die eliminating "negative" probabilities or meaningless redundancies (e.g., a hundred-sided die with fifty sides labeled "heads" and fifty sides labeled "tails"). The normalized die or the probability density function $\psi^2$, may be represented as the set $\{({}^1\psi_1)^2, ({}^2\psi_1)^2, \ldots ({}^{M1}\psi_1)^2, ({}^1\psi_2)^2, ({}^2\psi_2)^2, \ldots ({}^{M2}\psi_2)^2, \ldots ({}^1\psi_N)^2, ({}^2\psi_N)^2, \ldots ({}^{MN}\psi_N)^2\}$.

Before laying out additional details of the method, a mental model may help to understand the approach. Consider all potential, terminal (end) nodes in partial paths to be evaluated (for being kept or deleted for further consideration). For each node, a certain number of probabilities exist, representing a normalized probability that a subject node will be selected for inclusion in a path. The probability may derived from either the incremental probability of the support being located at that node after a next step, or the total probability of that node being reached at the end of all steps to that point. The first example is a joint probability, the second a conditional probability. Probability may be a function of distance associated with a path, cost to traverse a path, benefit of traversing a path, bandwidth or capacity of a path, or the like.

Rather than deterministically selecting the "best" path or next step in a potential path, a random selection is made. However, a node having a higher probability will have more "chances" of being selected (and will thus be likely to be selected more times or more often) in a "random" selection of candidates for possible next nodes to be included in the path. The cost or benefit may then be evaluated to limit the number of included nodes to the support allowed.

The function ψ is called the wavefunction of the support. To reduce the indeterminate state $\psi^2$ to N partial paths, "throw" the $\psi^2$ die N times. If duplicate path hits appear, they are ignored and one can "roll the dice" again. If the sum total of look-ahead paths is less than N then all look-aheads survive. Thus the development of the support is guided by the wavefunction ψ in a non-deterministic way. To make the method deterministic, one could simply pick the "best" N cumulative look-ahead costs directly out of C.

Classical Superposition:

An element of $\psi^2$ represents the probability that a particular partial path will converge to a particular adjacent neighbor in S. Therefore when partial paths $^*\rho_n$, $^*\rho_m$ approach each other in S, their associated distribution functions $\{({}^k\psi_n)^2\}$, $\{({}^j\psi_m)^2\}$ constructively interfere.

For Q, the set of points in S that are cardinality 1 away from the endpoints of both $^*\rho_n$ and $^*\rho_m$, the probability that some point in Q intersects the support after reduction is $$\sum_{q\in Q} [({}^q\psi_n)^2 + ({}^q\psi_m)^2].$$

The superscript q is the "appropriate" edge index (if multiple edges at the endpoint of $^*\rho_n$ connect to q then $({}^q\psi_n)^2$ is the sum of the associated probabilities).

This attribute of constructive interference for superposition, along with the "steering force" of the global geometry and the "selection pressure" of the reduction operation results in a tendency for the support to evolve as a kind of self-coherent wave packet in a reasonably smooth metric.

When two or more partial paths join at a point q, the path with "best" cost survives as a supporting partial path. Though no longer active, the other intersecting paths are maintained as lists of edges that are undefined—i.e., not "allowable" motions—for the remaining active paths generating the support. This frees the support from maintaining inefficient partial paths. However, for the cul-de-sac case (see below), if an active partial path is "backed up" along an unfruitful path segment past such an intersection, the undefined edges associated with the intersection may be released as allowable discrete "motions" for the support.

Complex Superposition:

The "best one" of the (up to) N partial paths may be less important than a good distributed path.

If the space S represents some real time communications network, path length may correspond to transmission time. One may break a large message down into many smaller "packages" to be independently sent. The number of message packages may be N, the size of the support. When partial paths $*\rho_n$, $*\rho_m$ approach each other, $q \in S$ is in the intersection of the superposition states for both $*\rho_n$ and $*\rho_m$. If the two message packages associated with $*\rho_n$ and $*\rho_m$ were to arrive at q at the same time ($*t_n = *t_m$) they would be in conflict for local resources; both coming into q and going out toward y. If the message packages were to arrive at "sufficiently" different times, there would be no conflict. Thus, ${}^q\psi_n$ and ${}^q\psi_m$ may beneficially add destructively when $|*t_n - *t_m|$ is small and add in a progressively more constructive way as $|*t_n - *t_m|$ gets larger. One may thus represent $\psi$ such that the probability that either $*\rho_n$ or $*\rho_m$ were to deliver to q is $\|({}^q\psi_n)+({}^q\psi_m)\|^2$, where $\lim_{(|*tn-*tm| \to 0)} \|({}^q\psi_n)+({}^q\psi_m)\|^2=0$, and $\lim_{(|*tn-*tm| \to \infty)} \|({}^q\psi_n)+({}^q\psi_m)\|^2=({}^q\psi_n)^2+({}^q\psi_m)^2$.

This single element may replace both elements $({}^q\psi_n)^2$, $({}^q\psi_m)^2$ in $\psi^2$. In terms of implementation, one now rolls up to two "dice". The first die governs the position of the support, as before. For the combined spatially correlated components of $\psi^2$, a secondary normalized density function is based on the contributing elements of $\psi^2$. Thus, "throwing" the second die determines the path. "Throwing" a first die N times, allows multiple hits on these combined components until all secondary positions have been taken.

Transmission time and path length are closely related in this example. Thus, one particular example of a possible phase angle may be $\phi=\pi-\tan^{-1}(k_t|l_{*\rho n}-l_{*\rho m}|)$, where $k_t>0$ is some appropriate correction factor. For relative interaction between wave functions ${}^q\psi_n$ and ${}^q\psi_m$, ${}^q\psi_n=[({}^q\psi_n)^2]^{1/2}{}_e{}^{i\theta n}$, ${}^q\psi_m=[({}^q\psi_m)^2]^{1/2}{}_e{}^{i\theta m}$, where $\theta_n=0$, $\theta_m=\phi$. $\phi$ is the phase angle between ${}^q\psi_n$ and ${}^q\psi_m$. When $|l_{*\rho n}-l_{*\rho m}|$ is small, $\phi$ is close to $\pi$, so $\|({}^q\psi_n)+({}^q\psi_m)\|^2$ is close to zero. As $|l_{*\rho n}-l_{*\rho m}|$ increases, so does the probability that either $*\rho_n$ or $*\rho_m$ will propagate to q, approaching the least upper bound $({}^q\psi_n)^2+({}^q\psi_m)^2$. In this particular case $\psi$ plays the role of an exclusion principle. Thus, the method ℵ can accommodate a complex wavefunction, appropriate to the model, for the support if enough information is available in the graph to reconstruct $\psi$ from $\psi^2$.

The two kinds of superposition can be mixed. The N message packages might each be propagated along their own supports using classical superposition. The N supports are virtual in the sense that ultimately only one path from each support will be realized. However, were wavefunctions of two or more of the N supports to interact, they would do so under the rules of complex superposition.

Computing the Set C:

For the k'th partial path $*\rho_k$, with endpoint q, and cumulative cost $c_k$, each edge $e_n$ connected to q has a corresponding point $r_n$ on the interval [0, 1]. Here, $$r_n = {}^{en}d_s(q, y) \Big/ \sum_j ({}^{ej}d_s(q, y)),$$

where j indexes all edges connected to q.

The finite set $\{r_k\}$ (k indexing all edges connected to q) is well defined. If $\min(\{r_k\})=\max(\{r_k\})$, one may define the set $\{R_k\}$, where $R_k=0$ for all k; otherwise define $R_k=(r_k-\min(\{r_k\}))/(\max(\{r_k\})-\min(\{r_k\}))$. The look-ahead cost for the edge $e_n$ connected to q may be expressed as ${}^nc_k=c_k+\omega_{en}+\zeta e_n(t)+R_n\omega_e$, where again j is an index over all edges connected to q. The weighting factor $\omega_e$ may be realized as: the average (or median) $\omega_e$ over the entire graph, the average (or median) $\omega_e$ over some neighborhood (in terms of path cardinality) of q, the average (or median) $\omega_e$ for all edges connected to q, the max (min) $\omega_e$ for all edges connected to q, or $\omega_{en}$, depending on how one weights the "tug" toward y. In certain embodiments, one may factor in the distance $d_S(q,y)$ in figuring the "global" cost term; e.g. the distance-based inverse square law for electric and gravitational fields.

Generalized Inertia:

In many embodiments an inertial term may be added to ${}^nc_k$ to keep the partial path from doubling back on itself. Using a transformation one can find the set $\{M_n\}$ generated by $$^{en}d_s(q, q') \Big/ \sum_j ({}^{ej}d_s(q, q')),$$

where $q^I$ is the predecessor to q on path $\rho_k$.

An inertial term for ${}^nc_k$ may be expressed as $-M_n\omega_e$.

The negative sign indicates that a solution is not desired to move toward $q^I$. We can add more inertial terms for $q^{II}$, $q^{III}$, etc. as desired. To make all terms in the cost function positive, one may use $(1-M_n)\omega_e$ for the inertial term. Thus, the edge $e^I$ connecting q to $q^I$ may be an undefined motion. A partial path cannot then "back up" along its own previously selected segments.

Avoiding Cul-de-sacs:

A partial path should preferably not be allowed to intersect itself. If a partial path blocks itself across all superposition states, the method may back up to a predecessor $q^I$, marking all edges connecting $q^I$ and q as undefined and continuing the path analysis.

Stopping ℵ:

Iterations may continue until a path reaches destination y or until it is making no forward progress. The method may then return the best cost path of the (up to) N possible. By "no forward progress" may be meant that the method "backing up" more than it is going forward, is not "on average" getting any closer to y, or has exceeded some time limit without reaching y.

If at least one complete path exists from x to y, the best cost path is returned. If a complete path is required, but cannot be generated, the method may return the (x, y) geodesic. Otherwise, the method may return the partial path of best cost and closest approach (in the vacuum) to y.

EXAMPLE II

User-Assisted, Automatic, Image Segmentation

One embodiment for the invention may be used to isolate meaningful visual elements of an image (photo-real or clip art) with a few, relatively imprecise movements of a "pointing" device such as a mouse. The isolated element can then be independently manipulated (e.g., cut, copy, paste, stretch, rotate, change hue/saturation/intensity, etc.) as an independent "object."

An automatic (or smart) scissors tool may rely on two main processes, edge map creation logic and tool process logic. At the beginning of an edit session, the edge map thread may be spun off in the background when an edit image is first encountered. Edge map creation is time consuming and, therefore, runs best in the background, writing its output data to a separate file. Edge map data may be used later to "channel" the method (tool) along.

Tool logic comes into play when a user selects the automatic scissors as a current tool, such as from a graphics editing palette. The user may simply point to an edge of a desired visual feature, image, object, or the like, using a pointing device, such as a mouse. Selection of a starting point designated by a cursor corresponding to the pointing device may be followed by a user moving the pointing device to roughly direct a desired path in the direction of the edge. A colored, feedback or bordering line may be output, extending from the start point to the edge, near the cursor. The colored line closely follows the contours of the desired feature along the "best path" determined by a method of the invention, thus indicating the edge of the visual feature.

Along the way, the feedback line may need to be corrected or directed away from distracting edges, such as may occur when items overlap or intersect causing confusion as to the "best path" to follow. The correction may be accomplished by clicking the mouse at an appropriate point along the path (visual edge), establishing an "anchor point." The colored feedback line may remain but dim from the start point to the last anchor point to indicate a fixed or "frozen" state. An anchor point can be removed, such as by pressing a key (e.g., backspace) at any time during the process. In very edge-weak or unusual areas of the an image, a scissors line can be manually drawn by pressing a key (e.g., shift) while moving the mouse. As soon as the manual (e.g., shift) key is released, automatic contouring may again resume.

When a user indicates successful completion of outlining a desired image, (e.g., double click), the tool may then respond by cutting out the selected area and placing an indicator (e.g. box) around the area. The user may then perform various manipulations, such as resizing, positioning, rotation, color adjustment, etc. The user may cut/copy, drag/drop, and the like.

An apparatus and method in accordance with the invention may rely on two parts, a method (edge logic) for finding edges (mathematical) between nodes, and a method (tool logic) for following a "most likely path" from the anchor point to the free point on the edge closest to the cursor.

Consider first the edge logic. Preliminarily, define an intensity image $I(x,y):R^2 \rightarrow R^1$ restricted to a (closed, bounded) domain D on $R_2$. The signal I may be acquired and digitized before being stored as a bitmap I (j,k). With I, j and k being bounded integer quantities, the domain and the range have been quantized. For example, the domain quanta may be pixels, and the range quanta may be gray scale values. The pixels may be indexed (e.g. by row, column) with respect to some arbitrary point on a rectangle (e.g., lower left, upper left, etc.). The term e=(I–I) may represent error due to representing I with I. A large part of a good edge detection algorithm is the strategy used to control this error.

A key to successful edge finding lies in emulating the human visual system's edge logic. In one embodiment of a method and apparatus in accordance with the invention, one may convert the image in question, bitmap, I, to a grayscale, and run a low-pass filter to smooth the grayscale image. For example, to convert to gray, let $I_{(i,j)}=0.3R_{(i,j)}+0.594G_{(i,j)}+0.106B_{(i,j)}$, where R=red, G=green, and B=blue values. Then, a low-pass filter may be $I_{(i,j)}=[4I_{(i,j)}+I_{(i-1j-1)}+I_{(i-1j)}+I_{(i-1j+1)}+I_{(ij-1)}+I_{(ij+1)}+I_{(i+1j-1)}+I_{(i+1j)}+I_{(i+1j+1)}]/12$.

A numerical estimate of a derivative, such as a modified Sobel operator, may be applied: $dI_{x(ij)}=[20(I_{(ij+1)}-I_{(ij-1)})+(I_{(ij+3)}-I(_{ij+1}))+I_{(ij-1)}-I_{(ij-3)})+(I_{(i-1j+1)}-I_{(i-1j-1)})+(I_{(i+1j+1)}-I_{(i+1j-1)})]/48$. Note, $dI_{y(i,j)}$ is simply $dI_{x(i,j)}$ rotated 90°. With the Sobel operator, form the gradient vector field $G=(dI_{x(i,j)}, dI_{y(i,j)})$. Then compute a "global normalizing" term, $$g_n = 8\left[\sum_{(m,n)} \|G_{(m,n)}\|^2 \Big/ \sum_{(m,n)} k\right) + \sigma\right],$$

where (m,n) is taken over all values for which G is non-zero and σ is the standard deviation for $\|G_{(m,n)}\|^2$.

The last step is to create a grayscale "edge map." For each non-zero $G_{(m,n)}$, create the unit vector $g_{(m,n)}$ in the direction of $G_{(m,n)}$. Consider the eight nearest neighbors to $G_{(m,n)}$ lying along the line orthogonal to the gradient vector, four on one side and four on the other. Form the sum $$c = \sum_{(j=1,8)} \|\langle g_j, g_{(m,n)}\rangle\|,$$

and then the product $p=c\|G_{(m,n)}\|^2$, where $g_j$ is the unit vector in the direction of the neighbor $G_n$. For $p>g_n$, set the (m,n)th pixel of the edge map to 255 (maximum gray value), otherwise set the (m,n)th pixel to $p/g_n$. All other pixels (for which G was the zero vector) are set to 0 (minimum gray value). This completes a basic edge map.

Alternatives may include Histogram Equalization (HE) as a prefilter to operate as preliminary transformation. One may operate on the grayscale image before differentiating.

Another alternative may be Laplace zero crossing (LZC). With LZC, extend the basic edge map by computing $d_{xx}$, $d_{yy}$ and look for zero crossings, testing for edge inflection. Although relatively time-consuming (compared to other methods above) for processing, the result is a relatively cleaner edge. This feature may be implemented by spawning another thread, incrementally enhancing an edge map without interfering with a user.

Another alternative may be to use a "measure derivative." Consider the images of neighborhoods of two pixels, $p_{(i,j)}$ and $p_{(ij+1)}$. Each neighborhood defines a (localized) probability density function $\psi_{(ij)}$ in frequency space. Define $\|\psi_{(ij)}-\psi_{(ij+1)}\|=[\int(\psi_{(ij)}-\psi_{(ij+1)})^2]^{1/2}$ as the magnitude of a proposed forward difference operator. Determine the sign of the difference by observing whether the quantity $\sigma_{(ij+1)}-\sigma_{(ij)}$ is positive or negative, where σ is the standard deviation of the corresponding neighborhood in the frequency domain. This derivative is sensitive to changes in texture. This method may contribute to the fidelity of the edge map.

The tool logic may be based on computing a "sum-over-histories" in the presence of a global "attractive" force toward a free point, local edge map "channeling" forces, and an inertial term (momentum). One rough (not rigorously accurate) way to visualize the process might be to think of the anchor point as a charge reservoir in a thunder cloud and the free point as a place on the ground where lightning will strike.

A user may select a point on an edge of a meaningful visual feature, image, or object. A user may employ any suitable type of pointing device. The user may then move the pointing device to a free point at another location on the edge of the image. The "best" curve connecting the anchor to the free point is desired. By best is meant that the curve follows the boundary of the visual element or object, if such exists. The curve representing the boundary should be path independent, the same regardless of the route the pointing device took from the anchor to the free point.

From the anchor point, a path can progress to one of only eight directly neighboring pixels. Since the curve is ultimately represented as an (ordered, connected) set of pixels, define a quantum or "atom" of motion as single step move from a pixel to one of its eight neighbors. A unit of motion, then, is entirely described by a state number from the set {1, 2, 3, 4, 5, 6, 7, 8}, omitting the no-motion state number 0 as trivial. For computational convenience, a motion state number may refers to a starting pixel with respect to a destination pixel, rather than vice versa.

If each such state is thought of as a history, (in view of the source and destination information implied) one may identify eight "histories." Each history may be represented by a position on a bitmap (i,j) and a linked list of motion states which, if followed, result in a curve from the anchor point to (i,j). An initial eight histories are simply the eight neighbors of the anchor point coupled with the appropriate motion state toward the anchor.

A history can only "move forward" toward eight allowed neighbors. With no initial reason to favor one motion state over another, a future history may occupy all eight states. Since no purpose is served by allowing a history to "back up" into itself, one may omit such a case and only allow seven "future" states. One may compute a probability for occupying each possible future history based on global curvature (does the next motion state lead toward the free point), local curvature (does next motion state move closer or farther from an edge of interest), or inertia (how radical a change in direction is required by the next motion state)

Allow all eight histories to advance into the sixty four possible future histories, and then partially collapse the expanding histories back to the most probable eight out of the sixty four. Any stranded histories may be deleted. Thus, eight "persistent" histories form something of a basis or support for a self-propagating localized "wave packet" moving along a "smeared" geodesic. The geodesic will ultimately be dominated by global curvature, hence terminating at the free point. When one or more support histories are sufficiently close to the free point, one may select the "most probable" support to be the "best" curve connecting the anchor to the free point.

To extend the method more generally, consider an anchor point, a free point, and a set s of all open curves c of finite length and terminating at the anchor point and the free point. Form a phase space S, where the points of the phase space are simply the elements of s. and the metric on S is derived from some notion of "closeness" between any two curves $c_k$, $c_j$ in s. For example, parameterize the curves: $c_k=[x_k(t), y_k(t)]$, where $0 \leqq t \leqq 1$. Then, Define:

$$\|c_k - c_j\| = \left[\int_{[0,1]} \|c_k(t) = c_j(t)\|^2\right] 1/2.$$

At the nth "step," each of the eight supports or "histories" $h_{n,k}$ ($1 \leqq k \geqq 8$) corresponds to a connected region $r_{n,k}$ in S. Define $R_n = U_k r_{n,k}$. Then, $R_n \subseteq R_{n+1}$.

In the presence of the edge map, one may define a probability density function P on S. That is, $0 \leqq P(n_c) \leqq 1\ \forall\ c \in S$, where $$\int_s P = 1$$

and $n_c$ is any neighborhood of c.

The method may attempt to follow a "dominating" chain $\{R_k\}$. That is, for all chains $$\{A_k\}, \int_{Rn} P \geq \int_{An} P,$$

where $A_n$ is the region associated with some alternative historical support at the nth step. The "best" curve is then selected from the limit set, $\cap R_k$.

Figure 6:
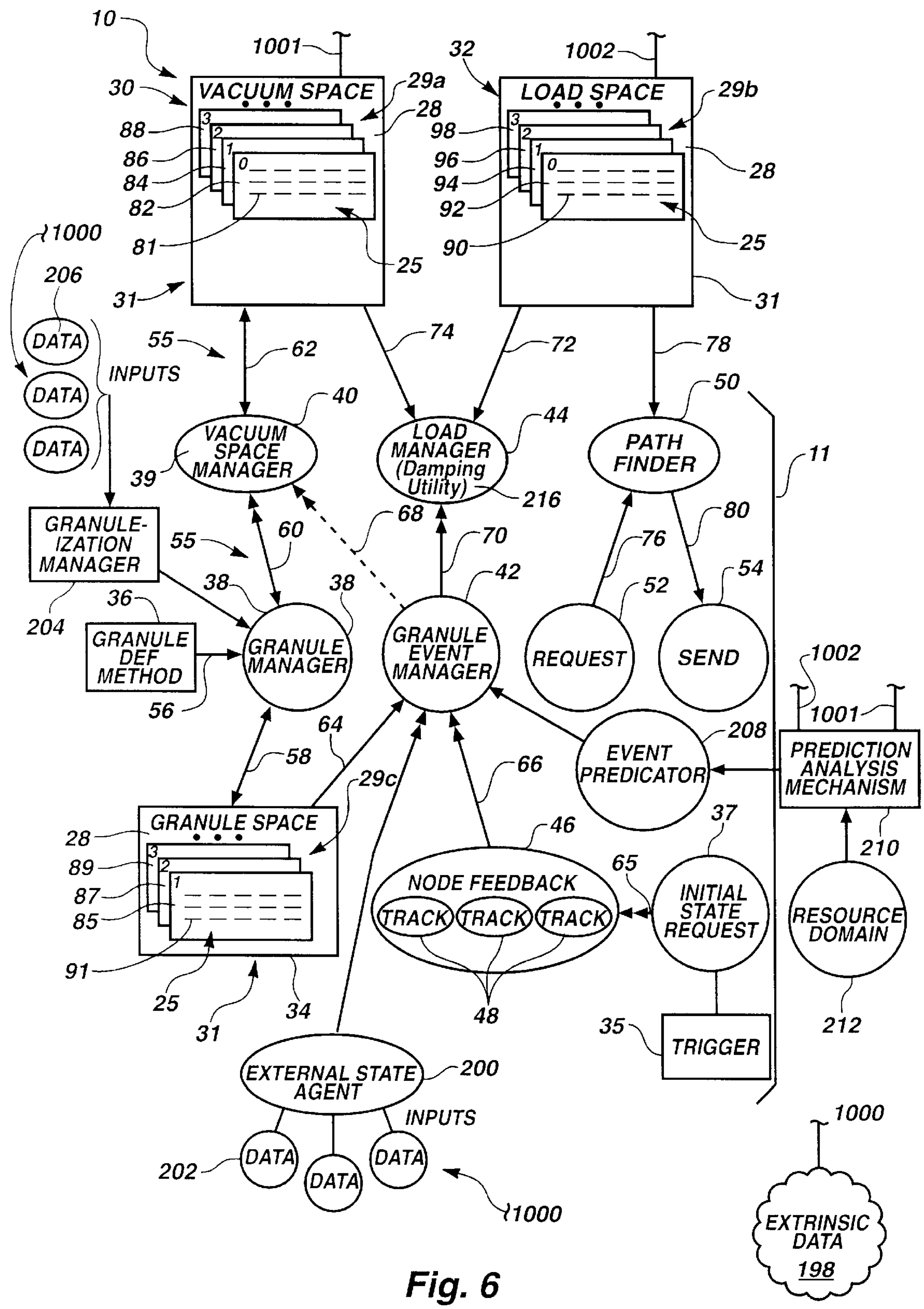
FIG. 6 is a schematic block diagram of an alternative embodiment of an architecture of a system configured in accordance with the invention.

Referring to FIG. 6, a schematic block diagram of an alternative embodiment of the present invention is illustrated wherein the invention relies upon extrinsic data to modify the load space and/or the vacuum space. In the embodiment of FIG. 6, the memory device contains one or more external agents. An external agent may be any agent that provides extrinsic data 198 for influencing loading decisions. Extrinsic data 198 may be data derived outside the management system 10 and which is used to generate weighting factors for potential paths or edges 20. Thus, the extrinsic data 198 is data relevant to the network 13 and which provides additional weighting information upon which to base a load decision. It is advantageous to have data extrinsic to the management system 10 to better provide an optimal path.

In one presently preferred embodiment, the extrinsic data 198 is provided to the granule event manager 42. The granule event manager 42 incorporates the extrinsic data 198 to influence and update loads. The granule event manager 42 receives both extrinsic data 198 and feedback from the node feedback 46 and integrates these data sets. The granule event manager 42 then provides data reflecting updated loads associated with edges 20 between granules 22 to the load manager 44. As explained above, each potential path or edge 20 has an associated weighted cost. The extrinsic data 198 is an additional factor for weighting the weighted cost associated with the edge 20.

One type of external agent is the external state agent 200, primarily directed toward extrinsic conditions affecting the state of the network 13, such as the state of nodes 14 or granules 22. The external state agent 200 enables review of extrinsic conditions effecting nodes 14 individually or collectively within the network 13. The memory device further contains data inputs 202 which comprise raw data reflecting node condition criteria. The data inputs 202 may be derived and received from the extrinsic data 198 through direct or indirect processes over line 1000. The data inputs 202 supply this raw data to the external state agent 200. The external state agent 200 then converts the raw data into a format compatible for the management system 10.

The criteria reflected in the data inputs 202 may include the capacity of individual nodes 14 to handle certain volumes of traffic. Thus, for example, certain nodes 14 may need to be avoided during rush periods because of their lack of capacity. Certain nodes 14 may also be upgraded to handle greater bandwidth.

The criteria may also reflect the reliability of the node 14. For example, servers that are more likely to be operational may be weighted more favorably for selection. Similarly, security considerations may also be criteria. Sensitive transmissions may not be sent to less secure nodes 14.

Data integrity is also a criterion, set to avoid data corruption and resending of the transmission. Another criterion is data priority, to rate the transmission based on content. Yet another criterion is a risk assessment of sending a transmission to a particular node 14 or granule 22.

The criteria available may also be time-sensitive to reflect any of the above circumstances during certain time intervals. The above listed criteria are only some examples of criteria to be weighted by extrinsic data 198 and one of skill in the art will appreciate that other criteria may also be incorporated. In deriving an optimal path, it is advantageous to have an apparatus which is sensitive to these criteria. Various factors may be influenced or completely controlled by extrinsic factors, yet effect the network 13.

The extrinsic data 198 provided to the data inputs 202 may be provided by an automatic cognitive process. By way of example, such automatic cognitive processes may relate to algorithms reflecting accounting concerns, preventive maintenance, storm warnings, political boundaries, the stock market, and so forth.

Alternatively, extrinsic data 198 may be provided to the data inputs 202 through human interaction. Thus, data inputs 202 may provide raw data indicative of human input through an interface. A user may influence the load decision by actively directing the system through or away from specific nodes 14 or granules 22. Direction provided by the human input may be regarded as an absolute which must be followed, or as a weighting factor to be considered in making a loading decision.

Thus, a user may actively direct load decisions by selecting intermediate nodes 14 or granules 22 as desired to guide the path from a start node 14 to a destination node 14. The selected nodes 14 or granules 22 may be regarded by the apparatus 10 as an absolute which must be incorporated. Thus, a user may override weighting factors of the management system and provide a user-preferred path. Alternatively, selected nodes 14 or granules 22 may be regarded as a suggestion which merit an additional weighting factor for that selected node 14 or granule 22. By way of example, a common interface for human input would incorporate the point and click features of a mouse.

Another type of external agent is the granulization agent 204 which receives extrinsic data 198 from data inputs 206. The data inputs 206 may receive and derive the extrinsic data 198 through direct or indirect processes over line 1000. The extrinsic data 198 contained in the data inputs 206 serves to influence granule definitions. In one presently preferred embodiment, the data inputs 206 are converted by the granulization agent 204 to a format compatible with the management system 10. The data inputs 206 are then provided to the granule manager 38. The data inputs 206 are utilized by the granule manager 38 to define the granule space 28. Ultimately, the granule space 28 and individual granule definitions are provided to the granule event manager 42 as explained above.

The data inputs 206 may provide extrinsic data 198 indicative of absolute node groupings or suggested node groupings. Suggested groupings of nodes 14 may be assigned a weighting factor for defining granules 22. Thus, a decision for granule definition may be influenced by extrinsic data 198.

The extrinsic data 198 may also represent criteria for granule definition. The criteria may include security concerns, geopolitical concerns, data priority, algorithmic decisions, external decisions, spatial relations, organization relations, security processes, reserved bandwidth and other processes based on additional granulization criteria. One of skill in the art will appreciate that other criteria may influence granule definitions and those listed are provided only by way of example.

As with the external state agent data inputs 202, the granulization data inputs 206 may include data derived from an automatic cognitive process (e.g. evaluation, recognition, etc.) or from human input. An automatic cognitive process may involve any number of the above listed criteria. In the event of human input, a user may manually select and define granules 22 or merely suggest granules 22. A user may base such input on the above listed criteria or arbitrary considerations including personal preferences.

An additional extrinsic agent is the event predictor 208. The event predictor 208 may receive prediction data from a prediction analysis mechanism 210. The prediction data may be based on past load events and is utilized by the apparatus to influence load decisions. The event predictor 208 converts the prediction data into a format suitable for the management system 10. In one presently preferred embodiment, the event predictor 208 provides the prediction data to the granule event manager 42.

The prediction analysis mechanism 210 may receive and compile data indicative of past load events. For example, load event data may be provided to a prediction analysis mechanism 210 from the vacuum space 30 and the load space 32 through direct or indirect processes over lines 1001 and 1002 respectively. The prediction analysis mechanism 210 may review load event data to establish patterns that indicate varying degrees of performance of the apparatus 10 with loaded edges 20 between nodes 14 or granules 22. Based on these patterns, the prediction analysis mechanism 210 may predict deterministically, statistically, or by artificial intelligence, the likelihood of successful use of an edge 20 for future loading. The prediction analysis mechanism 210 may take less time with a deterministic approach. Over time, a probablistic approach may become more valuable in establishing and relying on patterns whether or not understood. Artificial intelligence engines may add yet another degree of "learning."

A prediction analysis mechanism 210 may measure success based on the amount of a resource utilized by past load events. A resource domain 212 may supply data regarding resource utilization to the prediction analysis mechanism 210. The resource domain 212 may be directed toward a time resource wherein the amount of time to establish an optimal path is considered for defining success. Alternatively, other resources may be considered and provided to the prediction analysis mechanism 210. These may include criteria reflecting efficient use of the network 13, data integrity, and so forth as discussed.

Thus, by means of a prediction analysis mechanism 210 and the event predictor 208, the apparatus 10 can benefit from past experience. This allows the apparatus 10 to consider edges 20 between nodes 14 and granules 22 that have been unreliable in the past, thereby causing delays. The event predictor 208 may provide prediction data that can be incorporated as weighting factors in the selection of a node 14 or granule 22. Therefore, poor results with a node 14 may cause an unfavorable weight for future use. Alternatively, success with a node 14 may cause a favorable weight for future use.

The apparatus 10 illustrated in the embodiment of FIG. 6 further comprises a damping utility 216 within the load manager 44. A damping utility 216 may serve to reduce oscillations in data received from the granule event manager 42. Because extrinsic data from different sources will be introduced to the granule event manager 42, it is possible that the granule event manager 42 will produce data which varies substantially in wavelength amplitude. The damping utility 216 serves to "damp" the magnitude of incoming data wavelength against one another to thereby provide manageable data to the load manager 44.

Figure 7:
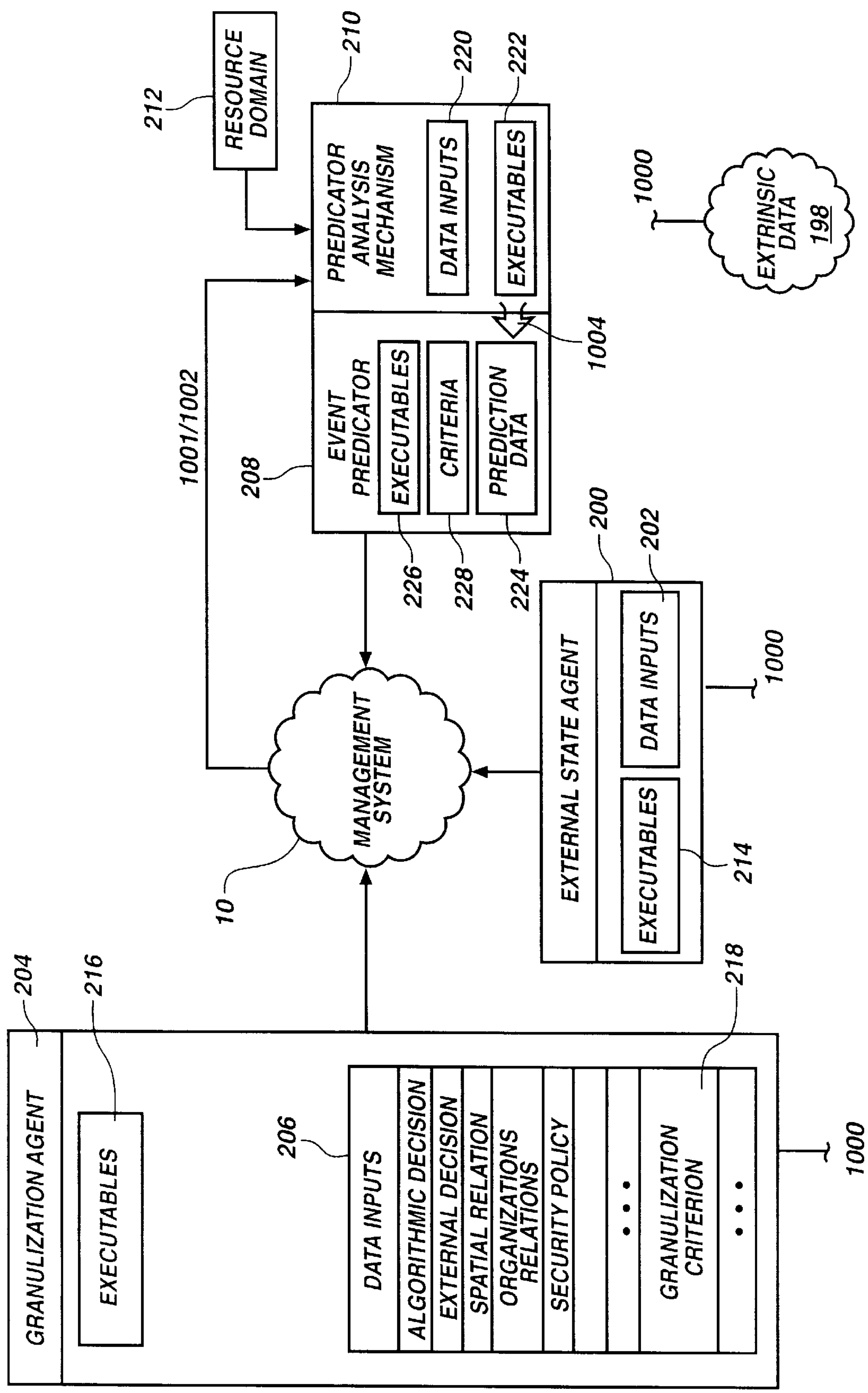
FIG. 7 is a schematic block diagram illustrating the extrinsic architecture of a system configured in accordance with the invention.

Referring to FIG. 7, a schematic block diagram of one embodiment of extrinsic architecture is shown. The management system 10 is generally indicated and by itself may operate as a static and/or feedback system. Feedback operations of the invention have been explained above. Extrinsic inputs are further illustrated which serve to provide extrinsic data to the management system 10. The extrinsic data 198 provided is based on previously selected criteria for basing load decisions.

The external state agent 200, granulization agent 204, event predictor 208, and prediction analysis mechanism 210 are generally indicated in relation to the management system 10.

The external state agent 200 comprises executables 214 for processing the external state agent data inputs 202 in accordance with the present invention.

The granulization agent 204 also comprises executables 216 for processing the granulization data inputs 206. The granulization data inputs 206 include granulization criteria 218 for defining the granules 22. A representative sampling of possible granulization criteria 218 are listed in FIG. 7 and other criteria may further be incorporated into the present invention.

The prediction analysis mechanism 210 processes the data inputs 220 representing load event data received over lines 1001 and 1002. The prediction analysis mechanism 210 comprises executables to process the data inputs 220 to establish patterns of performance in the loaded edges 20 and to produce predictions regarding future performance. Resulting prediction data 224 produced by the prediction analysis mechanism 210 is then transmitted via line 1004 to the event predictor 208.

The event predictor 208 comprises executables 226 for processing the prediction data 224. The event predictor 208 may further comprise criteria 228 for weighting the prediction data 224 or to establish a suggested weighting of the prediction data 224 to the management system 10. In this manner, the prediction data 224 may be weighted selectively to further improve performance.

Received extrinsic data 198 may be regarded by the management system 10 as an absolute directive which must be followed. Alternatively, extrinsic data 198 may be individually evaluated and assigned as an additional weighting factor for load decisions. In one presently preferred embodiment, the granule event manager 42 integrates feedback data 46 and extrinsic data from all extrinsic agents to derive updated load data to the load manger 44.

From the above discussion, it will be appreciated that the present invention provides a method and apparatus for providing an improved (near-optimal or pretty good) path between two granules 22 (nodes 14 or agglomerations of nodes 14 into molecules or super-molecules) within any network 13 or internetwork that may be represented mathematically as a connected graph. It will be further appreciated that the invention incorporates extrinsic data to refine an improved path. Thus, the invention provides a method and apparatus for managing network traffic in a network or internetwork of computing devices.

The invention, in one embodiment, provides a smart scissors tool for incorporation into a drawing or painting application package to be run on a computer by a user. The smart scissors tool provides a highly automated apparatus and method for designating and extracting visual features interpretable by an eye of a user, but heretofore not recognizable as individual objects by the drawing and painting applications available.

In another embodiment, an apparatus and method are provided by the invention for managing message traffic between parallel processes, or threads, operating on a single processor programmed with a multi-processing operating system. In another embodiment, the invention provides management of message traffic through a network of parallel processors, where the parallel processors may be integrated into a single mechanical device.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for providing a near-optimal path through a plurality of nodes interconnected by edges, each edge associated with a unique connection between two nodes, each node comprising a component, and the nodes configured in granules, the apparatus comprising:

granules interconnected in a topology, each granule comprising one or more nodes operably interconnected by an edge, each edge having associated therewith a connection state selectable from an unloaded state and at least one loaded state, and having associated therewith an edge state comprising data corresponding to the connection state;

a memory device comprising:

a vacuum space containing vacuum data corresponding to the topology of the granules, the topology corresponding to the unloaded state corresponding to each granule and each edge connecting each granule to a proximate granule;

a load space containing data corresponding to a topology of the granules in a loaded state comprising the granule states corresponding to a loaded state of the plurality of loaded states for each granule; and a processor operably connected to the memory device and programmed to execute an executable application comprising:

a granule manager effective to provide definitions of the granules, a load manager effective to create and update load data stored in the load space, a granule event manager effective to provide data reflecting updated loads associated with edges between granules, an external agent for providing extrinsic data to the granule event manager wherein the extrinsic data influences loading decisions, and a vacuum space manager effective to receive data corresponding to events associated with changes in loading of the granules, and to update the load space with the load data corresponding to the events.

2. The apparatus of claim 1 wherein the external agent comprises an external state agent effective to receive data from external state agent inputs corresponding to node conditions.

3. The apparatus of claim 1 wherein the external agent comprises a granulization agent effective to receiving granulization data from granulization inputs.

4. The apparatus of claim 3 wherein the granulization agent provides granulization data to the granule manager to influence definition of the granules, and wherein the definition of the granules is provided to the granule event manager.

5. The apparatus of claim 1 wherein the external agent comprises an event predictor for receiving data corresponding to predicted load conditions from a prediction analysis mechanism.

6. The apparatus of claim 5 wherein the prediction analysis mechanism receives data reflecting loaded vacuum space and load space, wherein the prediction analysis mechanism receives data from a resource domain regarding allocation of a resource, and wherein the prediction analysis mechanism processes received data to provide data corresponding to predicted load conditions.

7. The apparatus of claim 1 wherein the load manager receives data from the granule event manager and wherein the load manager further comprises a damping utility for reducing the amplitude of oscillations in the received data.

8. The apparatus of claim 1 wherein the granule event manager receives extrinsic data and data reflective of feedback conditions and integrates the data to provide data reflecting updated loads associated with edges between granules to the load manager.

9. The apparatus of claim 1 wherein the extrinsic data reflects criteria selected from the list consisting of capacity, reliability, security, integrity, priority, and risk assessment.

10. A method for providing an improved path from a source node to a destination node through a network comprising a plurality of nodes interconnected between the source node and the destination node, the method comprising:

defining a connected graph corresponding to the network, the connected graph comprising mathematical nodes connected by edges;

defining a metric space associated with the connected graph, the metric space having associated therewith a metric effective to define a weighted cost associated with each edge;

providing an external input for weighting the weighted cost associated with each edge;

determining a first weighted cost associated with advancing from the source to each of a plurality of edges connecting the source to a corresponding plurality of first intermediate nodes;

determining a second weighted cost associated with advancing from a first intermediate node to each of a plurality of second intermediate nodes; and selecting a trial set of nodes from the plurality of first intermediate nodes, based on an evaluation corresponding to a distribution function and related to the second weighted cost; and deleting a deletable first intermediate node not included in the trial set, and corresponding to a less-preferable cost function associated with the deletable first intermediate node.

11. The method of claim 10 further comprising a backing step comprising selecting an exit node connected between the source and a terminal node, the terminal node being selected from the plurality of second intermediate nodes based on a non-preferred cost selected from the second costs.

12. The method of claim 11 further comprising an abandoning step comprising deleting from consideration all nodes between the terminal node and the exit node.

13. The method of claim 10 further comprising repeating the determining step and selection steps until a preferred path is determined between the source and the destination.

14. The method of claim 10 further comprising providing an inertial step effective to provide an undesirable weighted cost associated with any edge between a first intermediate node and a second intermediate node where the second intermediate node has been designated previously as a previous first intermediate node with respect to the first intermediate node as a previous second intermediate node.

15. The method of claim 10 further comprising:

defining a plurality of granules, each granule comprising at least one node;

implementing a steering function for guiding advancement along a path segment comprised of edges, the path segment comprising a candidate path to be evaluated for consideration as a permanent segment of a satisfactory path between the source node and the destination node; and deleting from consideration all unsatisfactory edges by a process of superposition and reduction.

16. The method of claim 15 wherein superposition and reduction include::

providing a first partial expanding wavefront for testing a capacity of first edges passing through the first partial expanding wavefront at a first position to provide first results;

defining a second partial expanding wavefront for testing a capacity of second edges passing through the second partial expanding wavefront at a second position to provide second results;

deleting an unsatisfactory first edge selected from the first edges and corresponding to unsatisfactory second results, the unsatisfactory second results corresponding to second edges associated with the unsatisfactory first edges;

substituting the second partial expanding wavefront as a new first partial expanding wavefront; and substituting a third partial expanding wavefront as a new second partial expanding wavefront.

17. An apparatus for providing a near-optimal path through a plurality of nodes interconnected by edges, each edge associated with a unique connection between two nodes, each node comprising a component, and the nodes configured in granules, the apparatus comprising:

granules interconnected in a topology, each granule comprising one or more nodes operably interconnected by an edge, each edge having associated therewith a connection state selectable from an unloaded state and at least one loaded state, and having associated therewith an edge state comprising data corresponding to the connection state;

a memory device comprising:

a vacuum space containing vacuum data corresponding to the topology of the granules, the topology corresponding to the unloaded state corresponding to each granule and each edge connecting each granule to a proximate granule; and a processor operably connected to the memory device and programmed to execute an executable application comprising:

a granule manager effective to provide definitions of the granules, a load manager effective to create and update vacuum data stored in the vacuum space, a granule event manager effective to provide data reflecting updated loads associated with edges between granules, an external agent for providing extrinsic data to the granule event manager wherein the extrinsic data corresponds to load conditions for influencing loading decisions, and a vacuum space manager effective to receive data corresponding to events associated with changes in loading of the granules, and to update the vacuum space with the vacuum data corresponding to the events.

18. The apparatus of claim 17 wherein the memory device further comprises a load space containing data corresponding to a topology of the granules in a loaded state comprising the granule states corresponding to a loaded state of the plurality of loaded states for each granule.

19. The apparatus of claim 17 wherein the granule event manager receives extrinsic data and data reflective of feedback conditions and integrates the data to provide data reflecting updated loads associated with edges between granules to the load manager.

20. The apparatus of claim 17 wherein the extrinsic data reflects criteria selected from the list consisting of capacity, reliability, security, integrity, priority, and risk assessment.

* * * * *